US010487972B1

(12) United States Patent
Price et al.

(10) Patent No.: US 10,487,972 B1
(45) Date of Patent: Nov. 26, 2019

(54) HOSE MENDING DEVICE AND METHOD

(71) Applicant: Orbit Irrigation Products, LLC, North Salt Lake, UT (US)

(72) Inventors: Mitchell Lee Price, Springville, UT (US); Michael Bryan Doran, Salt Lake City, UT (US); Andrew Mark Urry, Herriman, UT (US); Karl L. Connolly, Bountiful, UT (US); Carter Timothy Oman, West Valley City, UT (US)

(73) Assignee: Orbit Irrigation Products, LLC, North Salt Lake, UT (US)

( * ) Notice: Subject to any disclaimer, the term of this patent is extended or adjusted under 35 U.S.C. 154(b) by 455 days.

(21) Appl. No.: 15/149,081

(22) Filed: May 6, 2016

Related U.S. Application Data

(60) Provisional application No. 62/157,895, filed on May 6, 2015.

(51) Int. Cl.
*F16L 55/165* (2006.01)
*F16L 33/22* (2006.01)

(52) U.S. Cl.
CPC ......... *F16L 55/1657* (2013.01); *F16L 33/226* (2013.01)

(58) Field of Classification Search
CPC ... F16L 19/0212; F16L 19/0218; F16L 31/00; F16L 33/16; F16L 33/18; F16L 33/223; F16L 33/224; F16L 33/226; F16L 55/165; F16L 55/1657; F16J 15/022
USPC .......................................... 285/15, 355, 370
See application file for complete search history.

(56) References Cited

U.S. PATENT DOCUMENTS

| | | | |
|---|---|---|---|
| 1,329,398 | A | 2/1920 | Hachmann |
| 1,936,552 | A | 11/1933 | Goss |
| 2,120,275 | A | 6/1938 | Cowles |
| 2,146,756 | A | 2/1939 | Miller |
| 2,245,101 | A | 6/1941 | Cole |
| 2,467,520 | A | 4/1949 | Brubaker |
| 3,055,682 | A | 9/1962 | Bacher et al. |
| 3,239,252 | A | 3/1966 | Schmitt et al. |
| 3,492,410 | A | 1/1970 | Kelly |
| 3,647,934 | A | 3/1972 | Hurtt |
| 3,752,506 | A | 8/1973 | Fouts |
| 4,169,967 | A | 10/1979 | Bachle |
| 4,392,678 | A | 7/1983 | Adamczyk |

(Continued)

FOREIGN PATENT DOCUMENTS

| | | | |
|---|---|---|---|
| EP | 503737 A1 * | 9/1992 | ............ F16L 19/061 |
| EP | 2045502 | 1/2012 | |

(Continued)

OTHER PUBLICATIONS

U.S. Appl. No. 15/149,076, filed May 6, 2016, Orbit Irrigation Products, Inc.

(Continued)

*Primary Examiner* — Josh Skroupa
(74) *Attorney, Agent, or Firm* — Austin Rapp

(57) ABSTRACT

The hose mending device may comprise a peripheral body circumscribing a first and a second opening and a chamber intermediate the first and second opening. A seal member comprising an annular portion and the cylindrical portion is disposed within the chamber such that the cylindrical portion may receive and engage an interior surface of a conduit of a particular size.

18 Claims, 32 Drawing Sheets

207 214 218 219 228 215 220 221 205 222 223 206 100 217 234 233 224 229 225 227 226 213 231

(56) References Cited

U.S. PATENT DOCUMENTS

| | | | | |
|---|---|---|---|---|
| 4,736,969 | A | 4/1988 | Fouts | |
| 4,801,158 | A * | 1/1989 | Gonni | F16L 25/0036 285/330 |
| 4,805,942 | A | 2/1989 | Goodridge | |
| 5,370,424 | A | 12/1994 | Wendorff | |
| 6,409,175 | B1 * | 6/2002 | Evans | E21B 17/042 277/314 |
| 6,860,520 | B2 | 3/2005 | Schwab | |
| 7,607,700 | B2 | 10/2009 | Duquette et al. | |
| 7,735,876 | B2 | 6/2010 | Chiu | |
| 7,914,048 | B2 | 3/2011 | Shemtov | |
| 7,980,601 | B2 * | 7/2011 | Oh | F16L 25/0036 285/354 |
| 8,910,980 | B2 | 12/2014 | Neal et al. | |
| 9,429,262 | B2 * | 8/2016 | Ericksen | F16L 37/091 |
| 10,125,903 | B1 | 11/2018 | Doran | |
| 2006/0097517 | A1 * | 5/2006 | Wu | F16L 33/223 285/305 |
| 2013/0049358 | A1 | 2/2013 | Wolff | |
| 2014/0116552 | A1 | 5/2014 | Kury | |
| 2014/0138944 | A1 | 5/2014 | Kury | |
| 2015/0316187 | A1 * | 11/2015 | Matsubara | F16L 33/26 285/390 |

FOREIGN PATENT DOCUMENTS

| | | | | |
|---|---|---|---|---|
| FR | 564619 | | 1/1924 | |
| FR | 1101782 | A * | 10/1955 | F16L 25/0036 |
| FR | 2468826 | A1 * | 5/1981 | F16L 33/224 |
| GB | 1494377 | A * | 12/1977 | F16L 27/0816 |
| WO | 2014139802 | | 9/2014 | |

OTHER PUBLICATIONS

Orbit Irrigation Products, Inc., Push on Mender (images 1-168), You Tube video [Online] [retrieved Sep. 8, 2016], uploaded on or before Jun. 24, 2014, Retrieved from the Internet: < URL: https://www.youtube.com/watch?v=qJ57p0wCuXo&feature=youtu.be> (shown in Attachment 1, Parts 1-7).

J.R. Wearing, Minimising Leakage of Hydraulic Connectors, pp. 16-28, Published on or before 1984. (see Attachment 2).

U.S. Appl. No. 62/157,895, Dated May 6, 2015 (shown in Attachment 3).

U.S. Appl. No. 62/157,893, Dated May 6, 2015 (shown in Attachment 4).

U.S. Appl. No. 60/371,559, Dated Apr. 10, 2002 (shown in Attachment 5).

U.S. Appl. No. 60/467,176, Dated May 1, 2003 (shown in Attachment 6).

File History for U.S. Appl. No. 10/807,747, all mail room dates on or before Sep. 21, 2006 (shown in Attachment 7).

Notice of Allowance and Fee(s) Due (including a Notice of Allowability section, an Examiner's Amendment section, an Allowable Subject Matter section, and a Reasons for Allowance section), U.S. Appl. No. 15/149,076, dated Jul. 11, 2018 (shown in attachment 9).

U.S. Appl. No. 15/932,250, filed Feb. 16, 2018, Oman.

Preliminary Amendment, U.S. Appl. No. 15/149,076, dated Aug. 16, 2017 (shown in Attachment 8).

* cited by examiner

HOSE MENDING DEVICE AND METHOD

RELATED APPLICATIONS

The present application is a non-provisional application of and claims priority to U.S. Provisional App. No. 62/157,895, which was filed on May 6, 2015, which application is incorporated herein by this reference.

TECHNICAL FIELD

The present invention relates generally to devices and methods for repairing a hose.

BACKGROUND

Garden hoses are used in many residences and businesses. Garden hoses, however, are susceptible to damage that impairs the utility and operation of the hose. While hose repair kits are currently available, consumers often simply discard a damaged hose. Accordingly, improved devices and methods for repairing a damaged garden hose, or other types of hoses, are desirable.

SUMMARY

Embodiments of the disclosed subject matter are provided below for illustrative purposes and are in no way limiting of the claimed subject matter.

The hose mending device may comprise a peripheral body circumscribing a first and a second opening and a chamber intermediate the first and second opening. A seal member comprising an annular portion and the cylindrical portion is disposed within the chamber such that the cylindrical portion may receive and engage an interior surface of a conduit of a particular size.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

Figure 1:
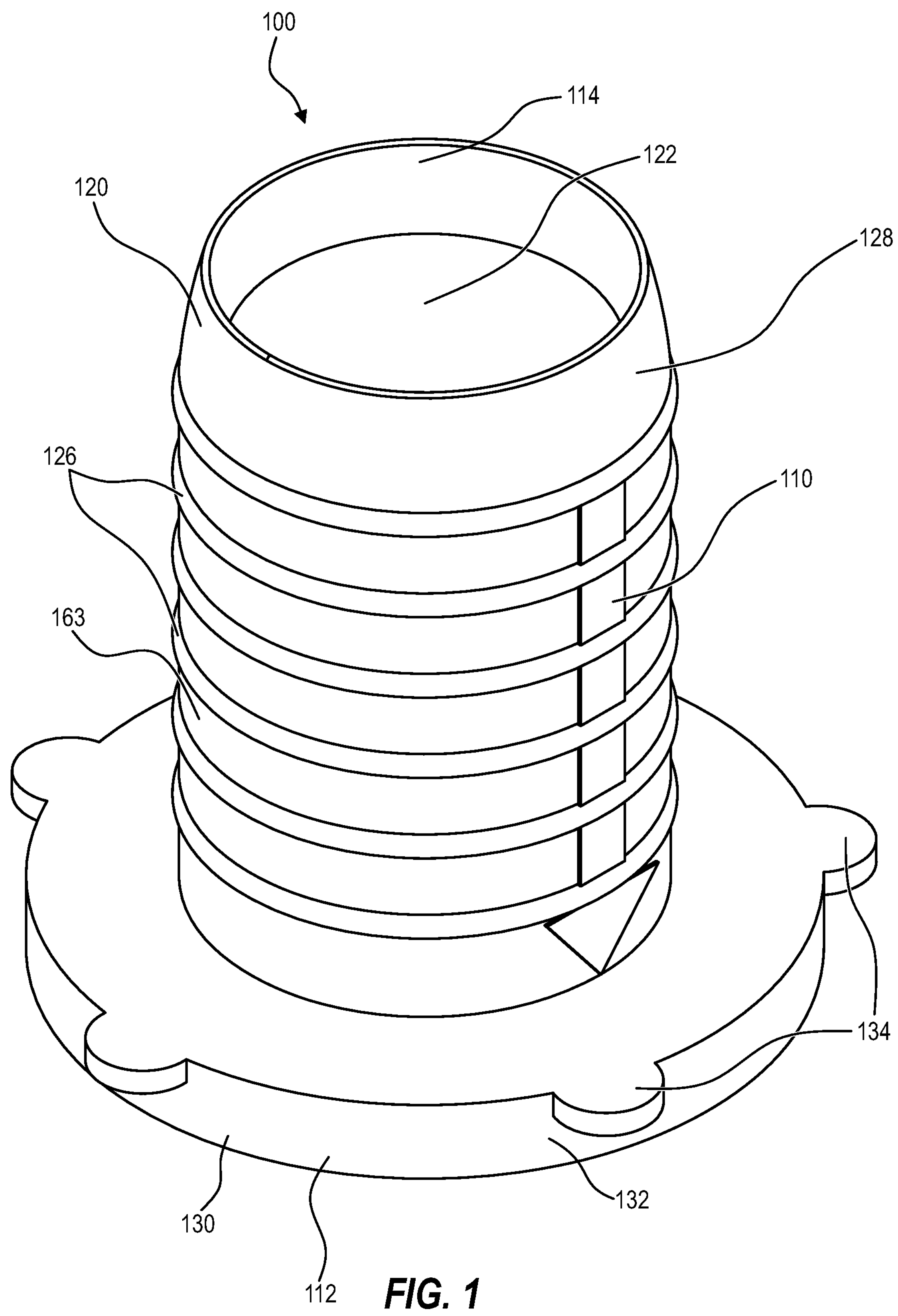
FIG. 1 is an elevated perspective view of one embodiment of a seal member.

In accordance with common practice, the various features illustrated in the drawings may not be drawn to scale. However, the drawings in FIGS. 1-6, 10-17, 19-22, and 24-27 of the present application are drawn to scale (within each figure only) and, accordingly, relative sizes of various features and components may be ascertained from the drawings based on a comparison of the relative features and components shown on a single figure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. With respect to various embodiments of the disclosed subject matter, the drawings in FIGS. 1-6, 10-17, 19-22, and 24-27 of the present application are drawn to scale (within each figure only) and, accordingly, relative sizes of various components may be ascertained from the drawings based on a comparison of the relative features and components shown on a single figure. Finally, like reference numerals may be used to denote like features throughout the specification and figures within FIGS. 1-9 ("Group 1") and within FIGS. 10-28 ("Group 2"). Like numerals, however, will not be used between Group 1 and Group 2 to denote like features between these two groups. Instead, if a feature shown in Group 1 is referred to in Group 2, the same reference numeral from Group 1 will be used rather than a similar number.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure and/or functionality in addition to, or other than, one or more of the aspects set forth herein based on information known to one of skill in the art.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The term "an embodiment," "an alternative embodiment" or "one embodiment" may refer to various configurations or embodiments of the disclosed apparatuses, systems or methods, in the singular or plural form, rather than referring to a single, particular embodiment.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

As used in this application, the term "abut" signifies physical contact or physical proximity of 5 cm or less.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Referring specifically to FIG. 1 and generally to FIGS. 2-6, various views of one embodiment of the seal member 100 are provided. The seal member 100 may comprise an annular portion 130 having an annular portion peripheral wall 132. The annular portion 130 may also comprise one or more tabs 134 extending radially outward from the annular portion peripheral wall 132. The seal member 100 may also comprise a cylindrical portion 120 (shown in FIGS. 1-4 and 6) having a cylindrical portion peripheral wall 128 (shown in FIGS. 1-4 and 6). The cylindrical portion 120 may also comprise one or more annular protrusions 126 (shown in FIGS. 1-4 and 6) extending from a cylindrical portion exterior surface 163 (shown in FIGS. 1-4 and 6) of the cylindrical portion peripheral wall 128 (shown only in FIGS. 1-4 and 6). The seal member 100 may include a combined central passageway 122 (shown in FIGS. 1-2 and 4-6). The combined central passageway 122 may be cylindrical in shape and include a combined central longitudinal axis 116 (shown in FIGS. 4-6). The seal member 100 may also comprise a directional arrow 110 (shown only in FIGS. 1-2), which indicates the direction of fluid flow during use of the seal member 100. Accordingly, the seal member 100 comprises an upstream end 114 (shown only in FIGS. 1-4 and 6) and a downstream end 112 (shown only in FIGS. 1-3 and 5-6).

Figure 2:
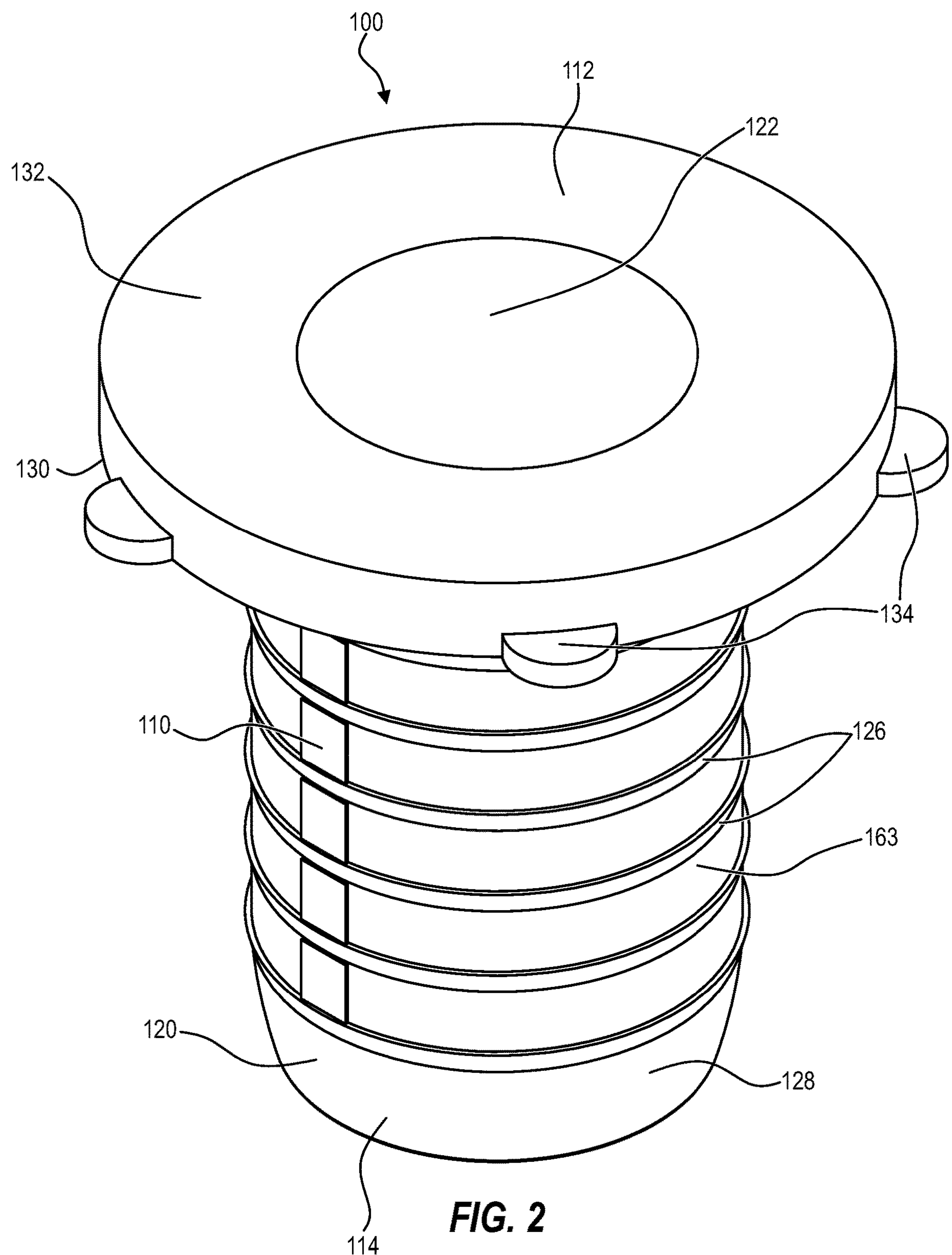
FIG. 2 is a lower, perspective view of the embodiment of the seal member shown in FIG. 1.
Figure 3:
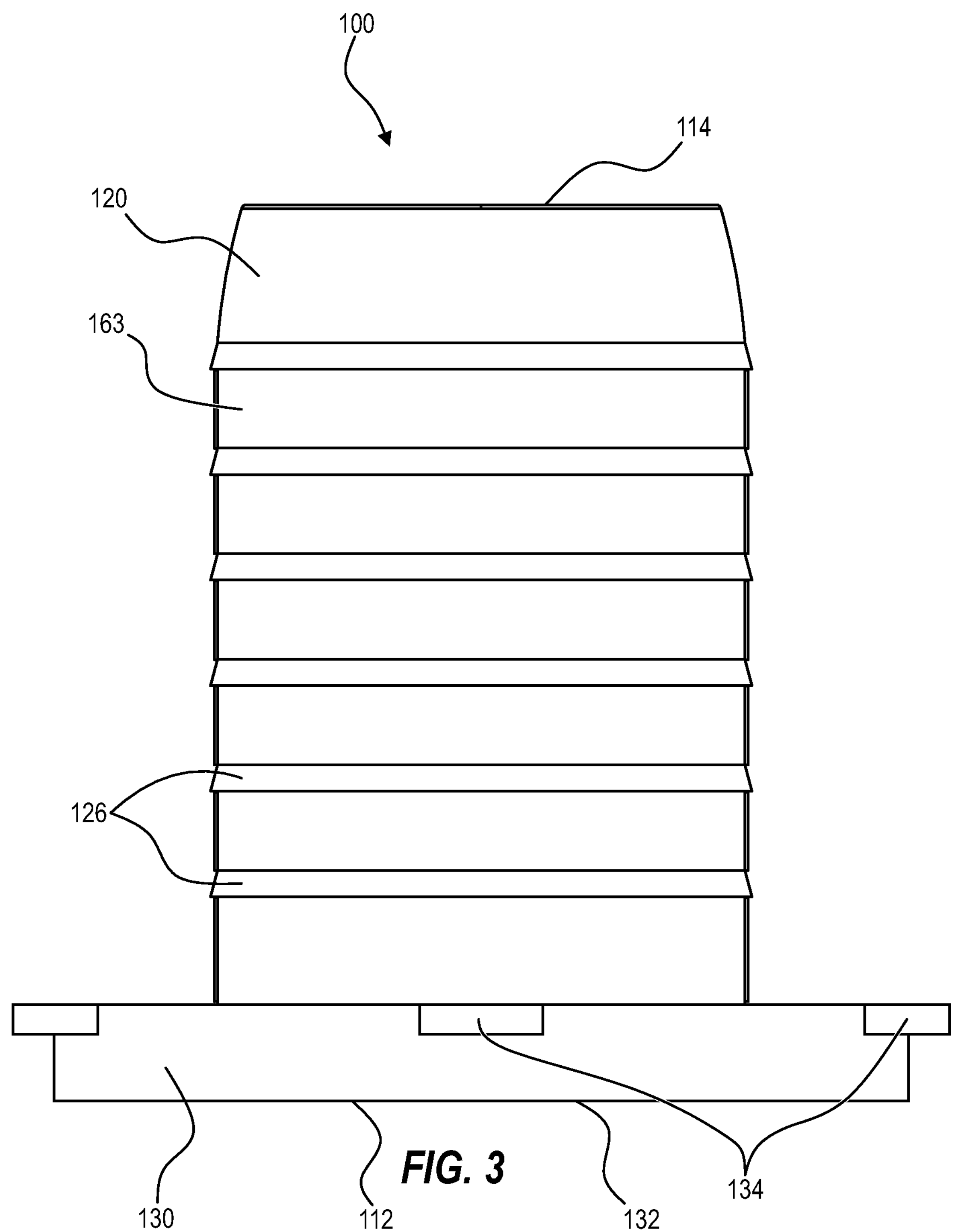
FIG. 3 is a side view of the embodiment of the seal member shown in FIG. 1.
Figure 4:
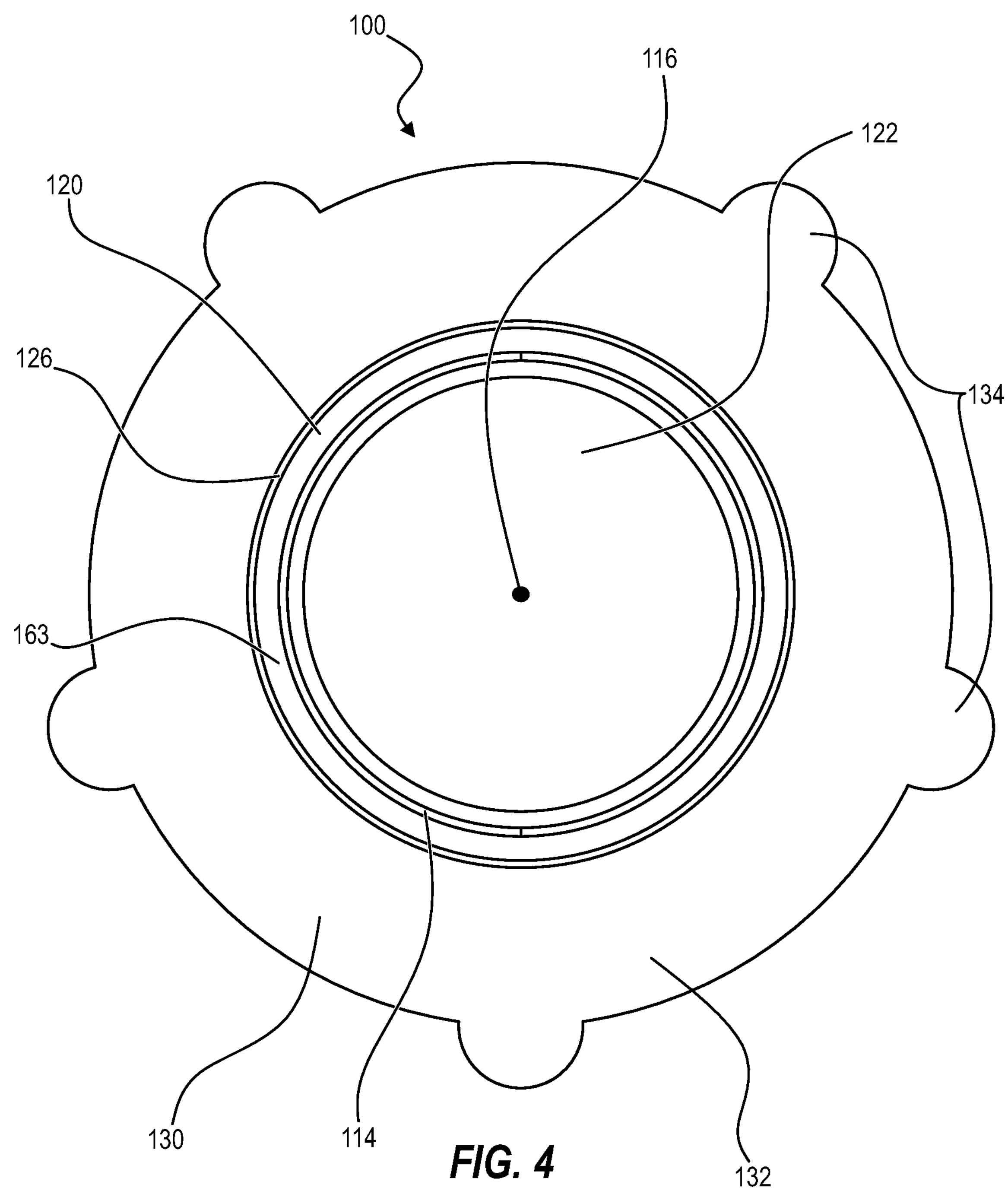
FIG. 4 is a top view of the embodiment of the seal member shown in FIG. 1.
Figure 5:
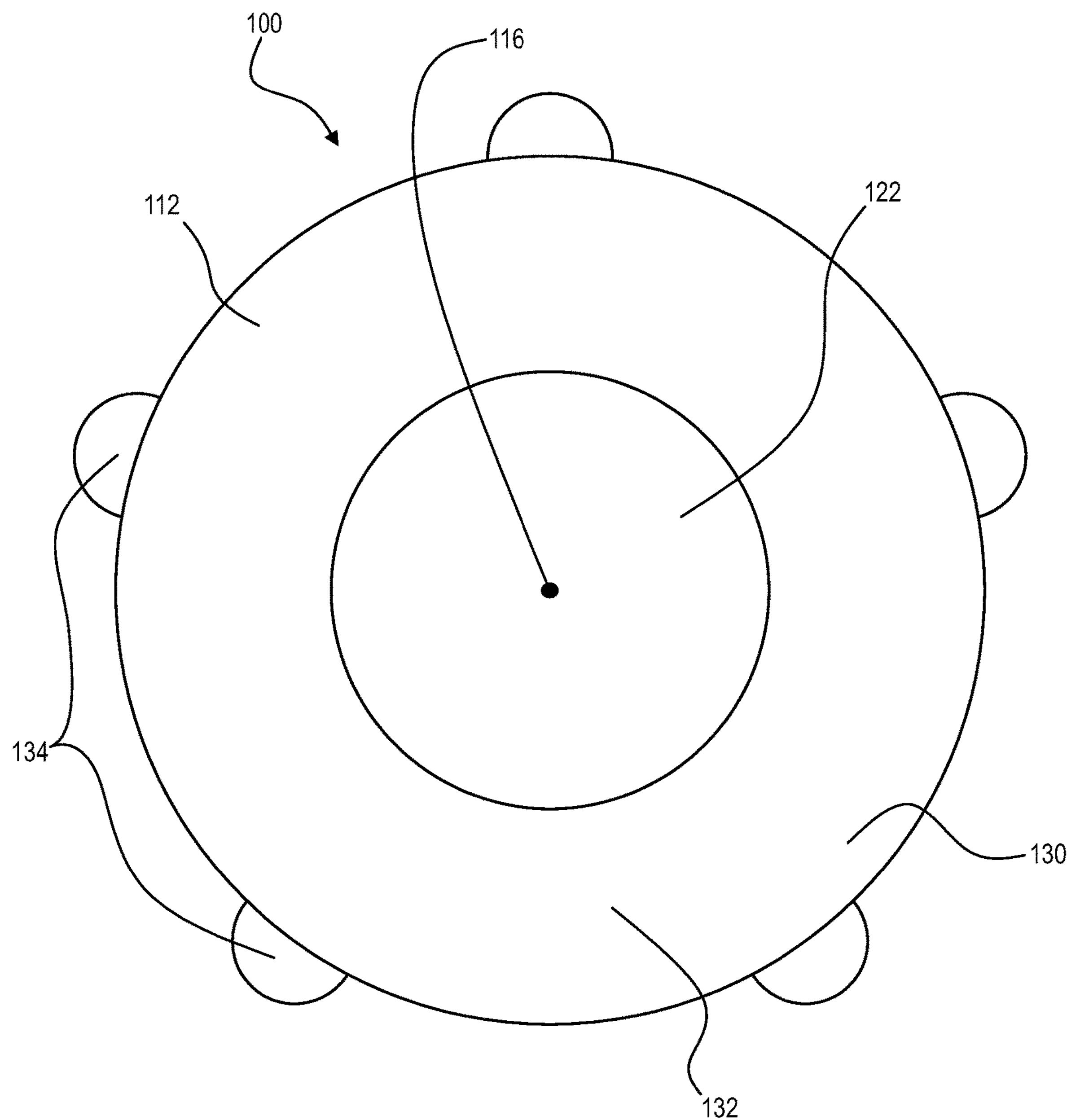
FIG. 5 is a bottom view of the embodiment of the seal member shown in FIG. 1.

Referring now specifically to FIGS. 1-2, the cylindrical portion 120, in various embodiments, may comprise a directional arrow 110 (best seen in FIG. 1) positioned on the cylindrical portion peripheral wall 128. In various alternative embodiments, the directional arrow 110 may be partially or completely disposed on the annular portion 130. The directional arrow 110 indicates the direction of fluid flow within the seal member 100 when the seal member 100 is properly installed and in use. The directional arrow 110 may be of a different color than remaining or surrounding portions of the seal member 100 or may be raised or recessed relative to remaining or surrounding portions of the seal member 100.

Figure 6:
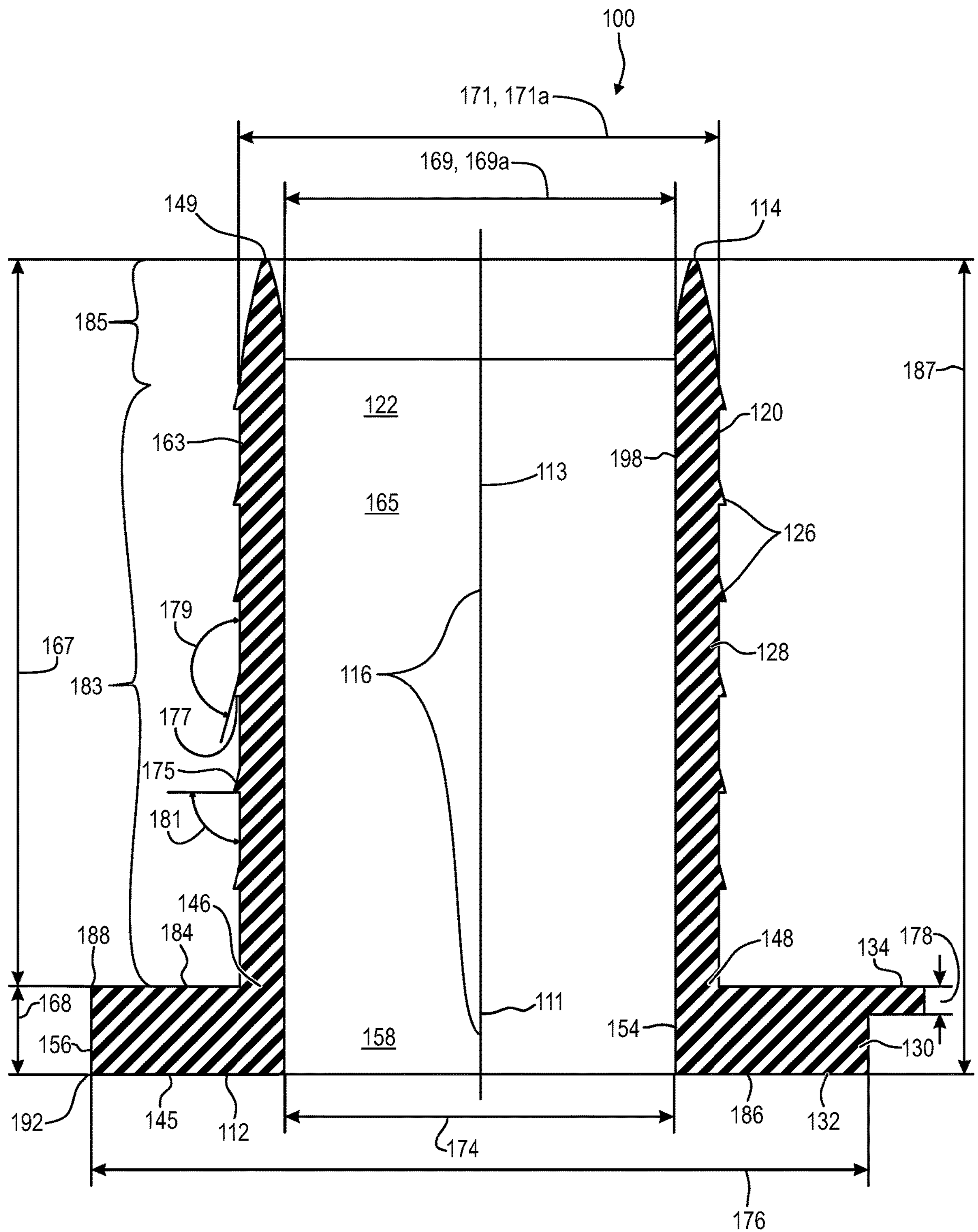
FIG. 6 is a side, cross-sectional view of the seal member shown in FIG. 1.

Referring now specifically to FIG. 6 and generally to FIGS. 1-5 (only certain elements discussed below are labeled or shown in all of FIGS. 1-5), the annular portion 130 may be generally in the shape of an annular disk and may comprise an annular portion peripheral wall 132. The annular portion peripheral wall 132 may comprise an annular portion distal end 145 and an annular portion proximal end 146. The annular portion distal end 145 is external to the seal member 100, while the annular portion proximal end 146 is internal to the seal member 100. The annular portion proximal end 146 abuts the cylindrical portion 120, or, more specifically, abuts a cylindrical portion proximal end 148.

The annular portion peripheral wall 132 may comprise an annular portion interior surface 154 and an annular portion exterior surface 156. The annular portion interior surface 154 may circumscribe the annular portion central passageway 158, which extends from the annular portion distal end 145 to the annular portion proximal end 146. The annular portion central passageway 158 may be cylindrical in shape, as illustrated in FIGS. 1-6.

Referring now more specifically to FIG. 6, an annular portion length dimension 168 may extend from the annular portion distal end 145 to the annular portion proximal end 146. An annular portion inner dimension 174 may be perpendicular to the annular portion length dimension 168 and may extend between opposing sides of the annular portion interior surface 154. An annular portion outer dimension 176 may be perpendicular to the annular portion length dimension 168 and may extend between opposing sides of the annular portion exterior surface 156.

Referring still specifically to FIG. 6, as indicated above, the annular portion 130 may comprise a series of circumferentially spaced tabs 134. The tabs 134 may be circumferentially spaced at regular intervals. The tabs 134 may extend radially outward from the annular portion exterior surface 156. In the embodiment illustrated in FIG. 6, the tabs 134 may be in the shape of a semi-cylinder (as best illustrated in FIGS. 1 and 2). In alternative embodiments, the tabs 134 may have, for example, the shape of cuboid, triangular prism, partial sphere or rectangular prism. As illustrated, the tabs 134 may have a tab length dimension 178 less than the annular portion length dimension 168 and may be situated on the annular portion exterior surface 156 adjacent to the annular portion proximal end 146 or the proximal planar surface 184 on the annular portion exterior surface 156. By way of example only, the annular portion length dimension 168 may be three to four times the tab length dimension 178. As will be explained later, the tabs 134 may interact with internal female threads into which the seal member 100 may be positioned during use.

Referring still specifically to FIG. 6, the annular portion peripheral wall 132 may be in the shape of an annular disk. Accordingly, the annular portion proximal end 146 may comprise a proximal planar surface 184, and the annular portion distal end 145 may comprise a distal planar surface 186. The annular portion exterior surface 156 has a rounded, cylindrical shape (i.e., the annular portion exterior surface 156 has the same shape of the exterior surface of a cylinder). As illustrated best in FIG. 6, the proximal intersection 188 of the proximal planar surface 184 with the annular portion exterior surface 156 may be at a right angle. In alternative embodiments, this proximal intersection 188 may be rounded, scalloped, or chamfered. The distal intersection 192 of the distal planar surface 186 with the annular portion exterior surface 156, may likewise be, for example, at a right angle, as illustrated in FIG. 6, or, alternatively, may be rounded, scalloped, or chamfered.

As indicated above, the seal member 100 may comprise a cylindrical portion 120 comprising a cylindrical portion peripheral wall 128. The cylindrical portion peripheral wall 128 may be generally in the shape of a cylindrical shell. The cylindrical portion peripheral wall 128 comprises a cylindrical portion interior surface 198 and the cylindrical portion exterior surface 163. The cylindrical portion peripheral wall 128 comprises a cylindrical portion distal end 149, which is external to the seal member 100, and a cylindrical portion proximal end 148, which is internal to the seal member 100. The cylindrical portion interior surface 198 circumscribes a cylindrical portion central passageway 165, which extends from the cylindrical portion proximal end 148 to the cylindrical portion distal end 149.

Referring still specifically to FIG. 6 and generally to FIGS. 1-5, a cylindrical portion length dimension 167 may extend from the cylindrical portion distal end 149 to the cylindrical portion proximal end 148. A cylindrical portion inner dimension 169 may be perpendicular to the cylindrical portion length dimension 167 and may extend between opposing sides of the cylindrical portion interior surface 198. A cylindrical portion outer dimension 171 may be perpendicular to the cylindrical portion length dimension 167 and may extend between opposing sides of the cylindrical portion exterior surface 163.

The cylindrical portion 120 may comprise a series of annular protrusions 126 that extend radially outward from the cylindrical portion exterior surface 163. The annular protrusions 126 may be spaced apart along the cylindrical portion length dimension 167. With reference specifically now to FIG. 6, the annular protrusions 126, in various embodiments, may comprise a long face 175 and a short face 177. The long face 175 may be disposed at a long face angle 179 (e.g., an obtuse angle) with respect to an adjacent or adjoining portion of the cylindrical portion exterior surface 163. The short face 177 may be disposed at a short face angle 181 (e.g., an acute or right angle) with respect to an adjacent or adjoining portion of the cylindrical portion exterior surface 163. In various embodiments, the long face angle 179 may be greater than the short face angle 181. The annular protrusions 126 may be in the shape of a frusto-conical shell (i.e., a peripheral portion of a frustum of a cone).

Referring still specifically to FIG. 6, the cylindrical portion peripheral wall 128 may comprise a portion of uniform thickness 183 and a narrowing portion 185. Within the portion of uniform thickness 183, a difference between the cylindrical portion outer dimension 171 and the cylindrical portion inner dimension 169 is the same (i.e., roughly the same taking into consideration any minor variation caused by the manufacturing process). Stated differently, within the portion of uniform thickness 183, both the cylindrical portion outer dimension 171 and the cylindrical portion inner dimension 169 are the same (i.e., roughly the same taking into consideration any minor variation caused by the manufacturing process).

Within the narrowing portion 185, either (1) the cylindrical portion inner dimension 169 increases relative to a cylindrical portion minimum inner dimension **169*a* in a direction extending from the cylindrical portion proximal end 148 to the cylindrical portion distal end 149 (hereinafter, "Increasing Inner Dimension"); (2) the cylindrical portion outer dimension 171 decreases relative to a cylindrical portion maximum outer dimension 171*a* in a direction extending from the cylindrical portion proximal end to the cylindrical portion distal end 149 (hereinafter, "Decreasing Outer Dimension"); or (3) both Increasing Inner Dimension and Decreasing Outer Dimension are used. Within the narrowing portion 185, use of the Decreasing Outer Dimension, mitigates the risk that the cylindrical portion distal end 149 will be caught and extended radially outward during insertion of the seal member 100 into a hose or other conduit. Within the narrowing portion 185, use of the Increasing Inner Dimension mitigates the risk that when pressurized fluid is passing through a conduit in which the seal member 100 is situated, the fluid will enter between the inner surface of the conduit and the cylindrical portion exterior surface 163**, which may potentially result in a leak.

Cross-sectional views of five illustrative variations of narrowing portions **185*a-e* are illustrated in FIGS. 7A-E. The first variation of a narrowing portion 185*a* utilizes a cylindrical portion peripheral wall 128*a* having both Increasing Inner Dimension and Decreasing Outer Dimension. Further, both the Increasing Inner Dimension and Decreasing Outer Dimension comprise a curved cross-sectional shape. This variation of the narrowing portion 185*a* thus includes an exterior, convex cross-sectional edge 133*a* and an interior convex cross-sectional edge 135*a*. In addition, a lubricant 161 (e.g., silicone grease, or another type of bio-friendly non-petroleum-based lubricant) is on the cylindrical portion exterior surface 163*a*. The lubricant 161 reduces friction between the cylindrical portion exterior surface 163*a* during insertion of the seal member 100 into a conduit and, like the Decreasing Outer Dimension, mitigates the risk that the cylindrical portion distal end 149*a* will catch and extend radially outward during the insertion process. The lubricant 161 may be used in connection with each of the embodiments of the seal member 100 and variations of the narrowing portions 185*a-e*** disclosed herein.

Figure 7A:
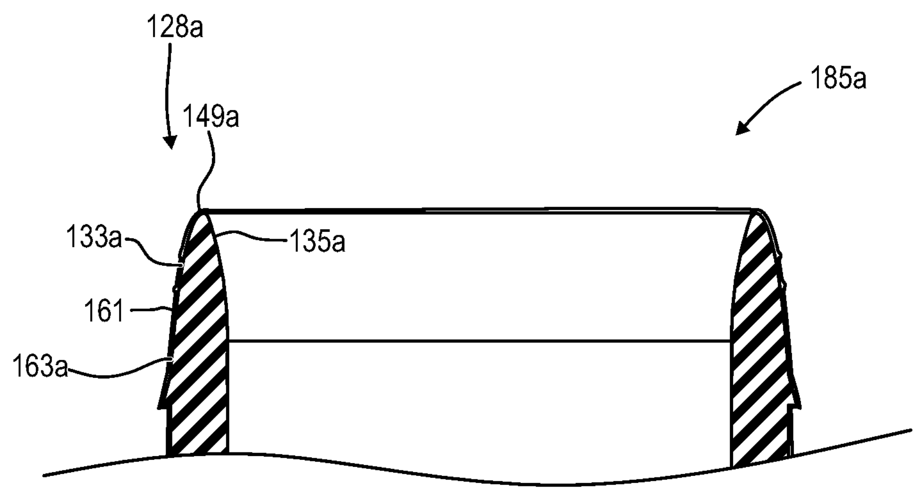
FIGS. 7A-7E comprise cross-sectional views showing variations of a narrowing portion of the seal member shown in FIG. 1.
Figure 7B:
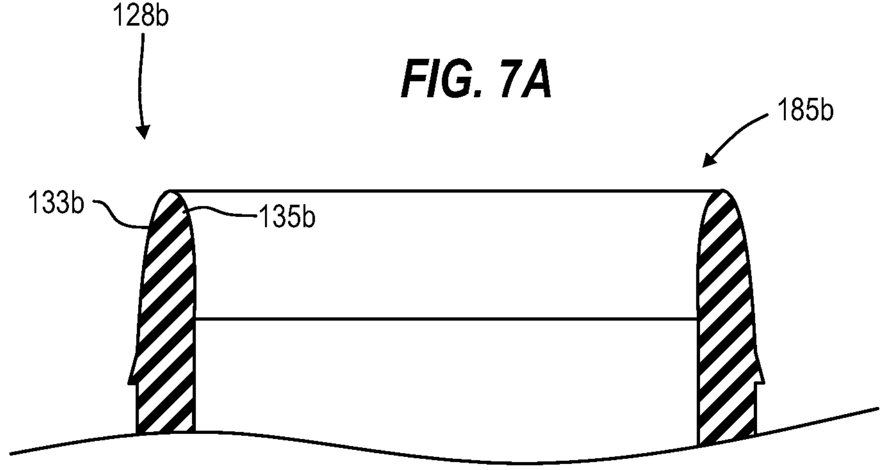
Figure 7C:
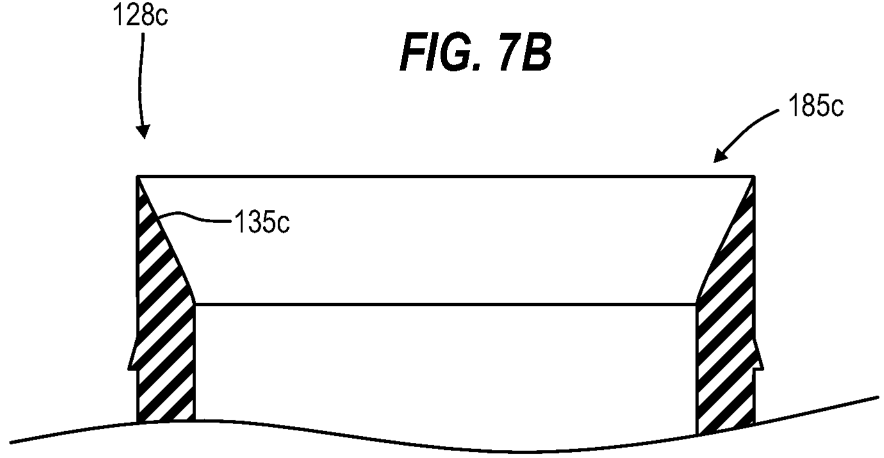
Figures 7D, 7E:
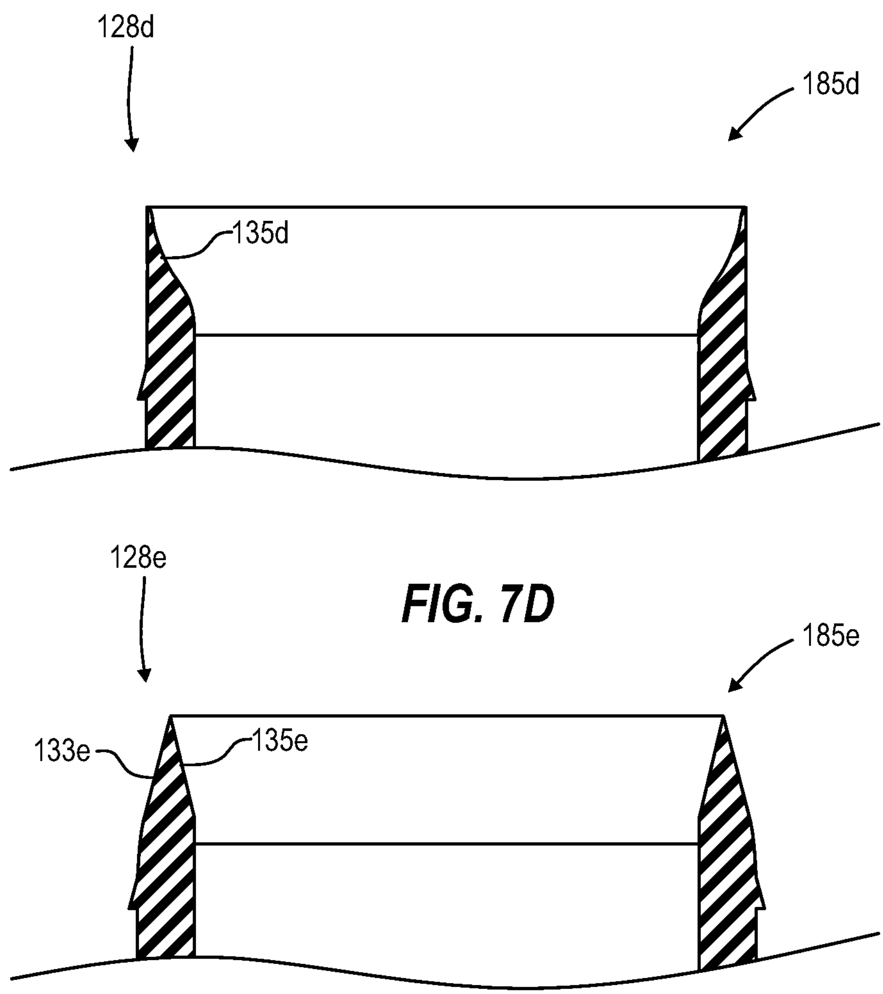

The second variation of a narrowing portion **185*b* utilizes both the Decreasing Outer Dimension and the Increasing Inner Dimension and employs a peripheral wall 128*b* having an exterior convex cross-sectional edge 133*b* (having greater curvature than the exterior, convex cross-sectional edge 133*a* shown in FIG. 7A) and an interior convex cross-sectional edge 135*b* (having greater curvature than the interior convex cross-sectional edge 135*a*** shown in FIG.

7A). The third variation of the narrowing portion 185_c_ employs a cylindrical wall 128_c_ having only the Increasing Inner Dimension and has an interior, linear cross-sectional edge 135_c_. A fourth variation of the narrowing portion 185_d_ employs only Increasing Inner Dimension and has a cylindrical portion peripheral wall 128_d_ having an interior, concave cross-sectional edge 135_d_. A fifth variation of the narrowing portion 185_e_ comprises both the Increasing Inner Dimension and the Decreasing Outer Dimension and has a cylindrical portion peripheral wall 128_e_ comprising an exterior, linear cross-sectional edge 133_e_ and an interior, linear, cross-sectional edge 135_e_. It should be once again emphasized that the variations of the narrowing portions 185_a-e_ are merely illustrative. In addition, for example, an exterior, convex cross-sectional edge could be combined within an interior, concave edge or an exterior, linear cross-sectional edge could be combined with an interior, convex cross-sectional edge.

Referring once again specifically to FIG. 6, the annular portion 130 may comprise an annular portion central longitudinal axis 111 positioned within the annular portion central passageway 158, while the cylindrical portion 120 may comprise a cylindrical portion central longitudinal axis 113 positioned within the cylindrical portion central passageway 165. A combination of the annular portion central longitudinal axis 111 and the cylindrical portion central longitudinal axis 113 may be referred to as a combined central longitudinal axis 116.

The combined central passageway 122 (as best seen in FIG. 6) may comprise a combination of the annular portion central passageway 158 and the cylindrical portion central passageway 165. The annular portion central passageway 158 may be cylindrical in shape; the cylindrical portion central passageway 165 may also be cylindrical in shape; and, further, the combined central passageway 122 may likewise be cylindrical in shape.

The combined central longitudinal axis 116 may be centrally positioned within the combined central passageway 122. As indicated in connection with FIGS. 3, 4, and 6, the cylindrical portion peripheral wall 128, the annular portion peripheral wall 132, the annular protrusions 126 and the combined central passageway may be symmetrical about any plane passing through the combined central longitudinal axis 116.

It should also be noted that a combination of the annular portion length dimension 168 and the cylindrical portion length dimension 167 may be referred to as a combined length dimension 187 (i.e., a length dimension 187 of the seal member 100, which may be referred to as the seal member length dimension 187).

The annular portion 130 (including the annular portion peripheral wall 132 and, optionally, the tabs 134) and the cylindrical portion 120 (including the cylindrical portion peripheral wall 128 and optionally the annular protrusions 126 and the directional arrow 110) may be integrally formed; or, alternatively, may be secured to each other at the annular portion proximal end 146 and the cylindrical portion proximal end 148 using, for example, adhesives or ultrasonic welding.

Figure 8:
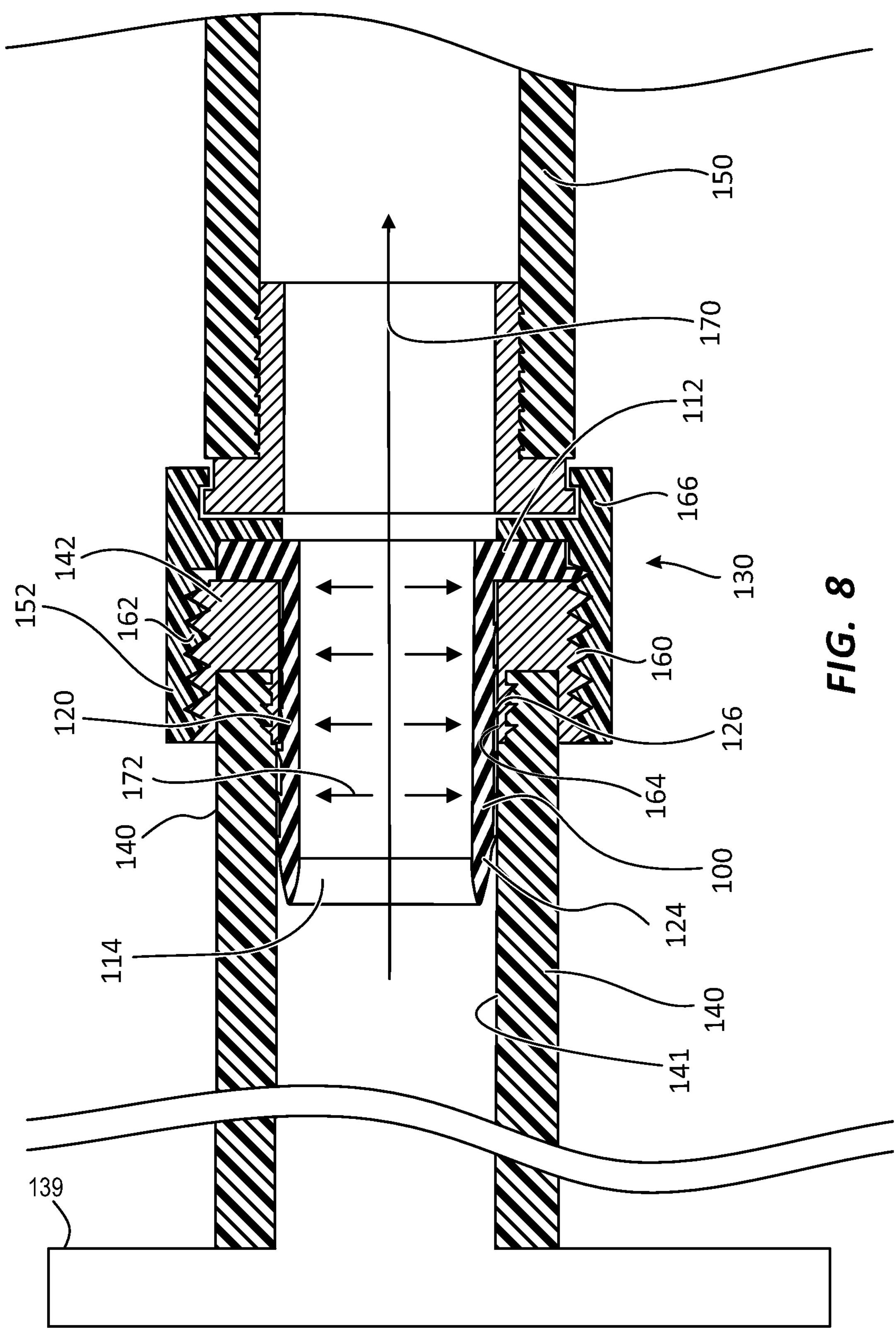
FIG. 8 is a cross-sectional view of a first hose coupled to a second hose employing the seal member shown in FIG. 1.

FIG. 8 comprises a side cross-sectional view of the embodiment of the seal member 100 shown in FIGS. 1-6 in use with two hoses 140, 150 coupled together. As illustrated in FIG. 6, the first hose 140, having a male coupling 142, is coupled to the second hose 150, having a female coupling 152. As illustrated, the female coupling 152 includes a rotatable portion 166 that may be turned to rotate the inward facing threads 162 of the female coupling 152 relative to the outward facing threads 160 of the male coupling 142. Of course, the illustrated couplings 142, 152 are only exemplary and other types of couplings may be used.

As illustrated in FIG. 8, the seal member 100 is interposed between the male and female couplings 142, 152. In particular, the annular portion 130 is interposed between the rotatable portion 166 of the female coupling 152 and the male coupling 142 in a sealing engagement. The annular protrusions 126 of the cylindrical portion 120 contact the interior surface 164 of the male coupling 142 and the interior surface 141 of the first hose 140 in a sealing engagement.

As illustrated, the fluid flow proceeds as indicated by the arrow 170 in FIG. 8. That is, the fluid flow proceeds from a pressurized fluid source 139 through the first hose 140 towards the second hose 150. Accordingly, the upstream end 114 of the seal member 100 is oriented upstream relative to the downstream end 112 of the seal member 100. In this orientation, the cylindrical portion 120 is also upstream relative to the annular portion 130. Accordingly, an outward radial pressure 172 is exerted on the cylindrical portion 120, resulting in greater engagement between the cylindrical portion 120 and the male coupling 142 and the hose 140 such that potential leakage is mitigated. It should be specifically noted that the outward radial pressure 172 causes the annular protrusions 126 to engage the interior surface 164 of the male coupling 142 and/or the interior surface 141 of the first hose 140, such that potential leakage is mitigated. Utilizing multiple annular protrusions 126, in operation, creates stages of protection, such that any leakage would have to pass through each of the stages created by multiple annular protrusions 126 in order for such a leak to extend outside of the seal member 100. Thus, in operation, the seal member 100 provides an enhanced sealing feature relative to conventional O-rings.

Figure 9:
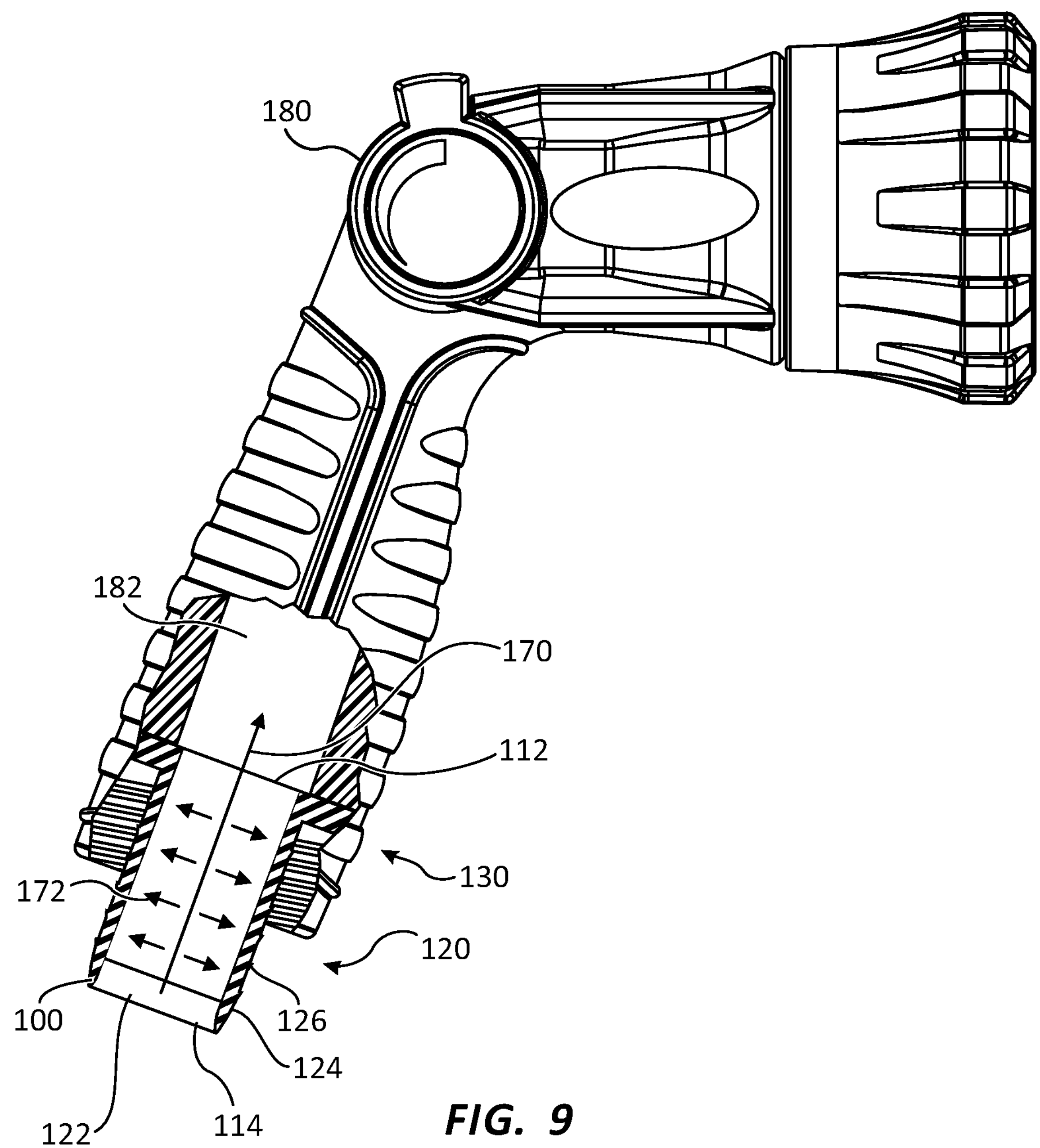
FIG. 9 is a partial cross-sectional view of a hose nozzle shown with a cross-sectional view of the seal member of FIG. 1.

FIG. 9 comprises a partial cross-sectional view of a hose nozzle 180 engaged with the embodiment of the seal member 100 shown in FIG. 1. As illustrated in FIG. 9, the seal member 100 is positioned within the passageway 182 of the nozzle. For simplicity, a fluid source and upstream conduit are omitted from FIG. 9.

As explained previously, the seal member 100 may include a cylindrical portion 120, including a narrowing region 124, one or more annular protrusions 126, and an annular portion 130. Also, as explained previously, the combined passageway 122 extends through the seal member 100. Accordingly, the combined central passageway 122 of the seal member 100 is in fluid communication with the passageway 182 of the hose nozzle 180.

The direction of the fluid flow in operation is illustrated by the arrow 170. Accordingly, the seal member 100 is oriented such that the upstream end 114 is upstream relative to the downstream end 112, and the cylindrical portion 120 is also upstream relative to the annular portion 130. Once again, in the case of fluid flow as indicated by the arrow 170, the radial pressure 172 would exert force on the seal member 100, thus providing a seal and mitigating the risk of leaks in the sealed area, as explained in more detail previously.

In various embodiments, the seal member 100, and variations thereof, may be formed (in whole or in part), for example, of EPDM rubber (ethylene propylene diene monomer (M-class) rubber) of a Shore A durometer greater than or equal to 75 and less than 85 for use in connection with systems having fluid pressure greater than or equal to 10 PSI and less than or equal to 150 PSI (e.g., in residential watering systems). In various alternative embodiments, a material of a Shore A durometer of greater than or equal to 75 or less than or equal to 85, between about 75 and about 85, or greater than or equal to 70 or less than or equal to 85 may be used, although failure rates may be higher near the boundaries of this range. As used in this application, the term "about" signifies plus or minus 3 Shore A durometer points. If the seal member 100 is formed from a softer material (below the durometer ranges identified above), the seal member 100 may collapse and fail to form a proper seal. If the seal member 100 is formed from a harder material (above this range), the seal member 100 may be too rigid and, once again, may not form a proper seal within the PSI range identified above. In systems in which the pressure is above this range, the seal member 100 may be formed of a material having a higher durometer. The seal member 100 may also be formed from various materials beyond EPDM, such as latex rubber, natural rubber, silicone and other materials having resiliency and other characteristics similar to rubber.

In one embodiment, the cylindrical portion length dimension 167 may be at least 22 mm such that the cylindrical portion 120 extends well beyond the coupling of a conduit or hose with which the enhanced seal is engaged such that the cylindrical portion exterior surface 163 and/or annular protrusions 126 can form a sealed engagement with the interior surface of a conduit or hose. In various embodiments, the cylindrical portion length dimension 167 may be at least two, three, or four times the annular portion length dimension 168. In one embodiment, the annular portion outer dimension 176 may be at least 1.1, 1.2, 1.3 or 1.4 times the cylindrical portion outer dimension.

It should also be noted that the combined central passageway 122 illustrated in the figures is cylindrical in shape. In alternative embodiments, the combined or unified passageway may have the shape of a hexagonal or octagonal prism. It should also be noted that in certain embodiments when circular, cylindrical, or rounded regions are employed, the dimensions mentioned above may comprise diameters rather than merely dimensions.

As used in this application, the term coaxially aligned, or its grammatical variants, refers to a relative position of two items in which a central longitudinal axis of each of the items are situated such that the central longitudinal axis of each item, if extended infinitely, would occupy or comprise the same line.

Various modifications to these foregoing aspects will be readily apparent to those skilled in the art, and the principles defined herein may be applied to other aspects without departing from the scope of the disclosure. For example, the number of the tabs 134 and annular protrusions 126 shown in the figures is merely illustrative. The number of these items 126, 134 may be varied within the scope of the disclosed subject matter. Thus, the present disclosure is not intended to be limited to the aspects shown herein but is to be accorded the widest scope consistent with the principles and novel features disclosed.

Figure 10:
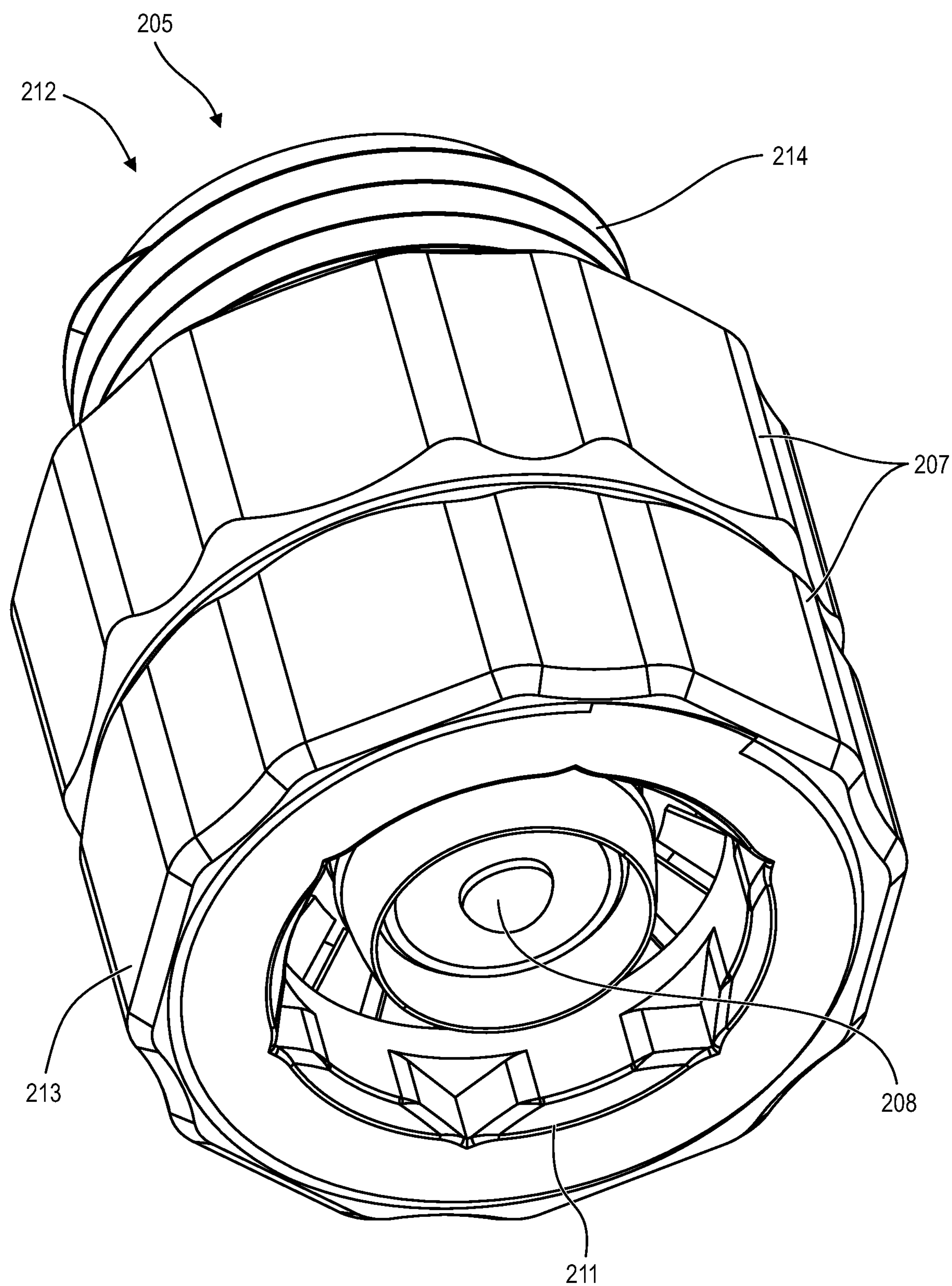
FIG. 10 is an elevated perspective view of a first embodiment of a hose mending device.
Figure 11:
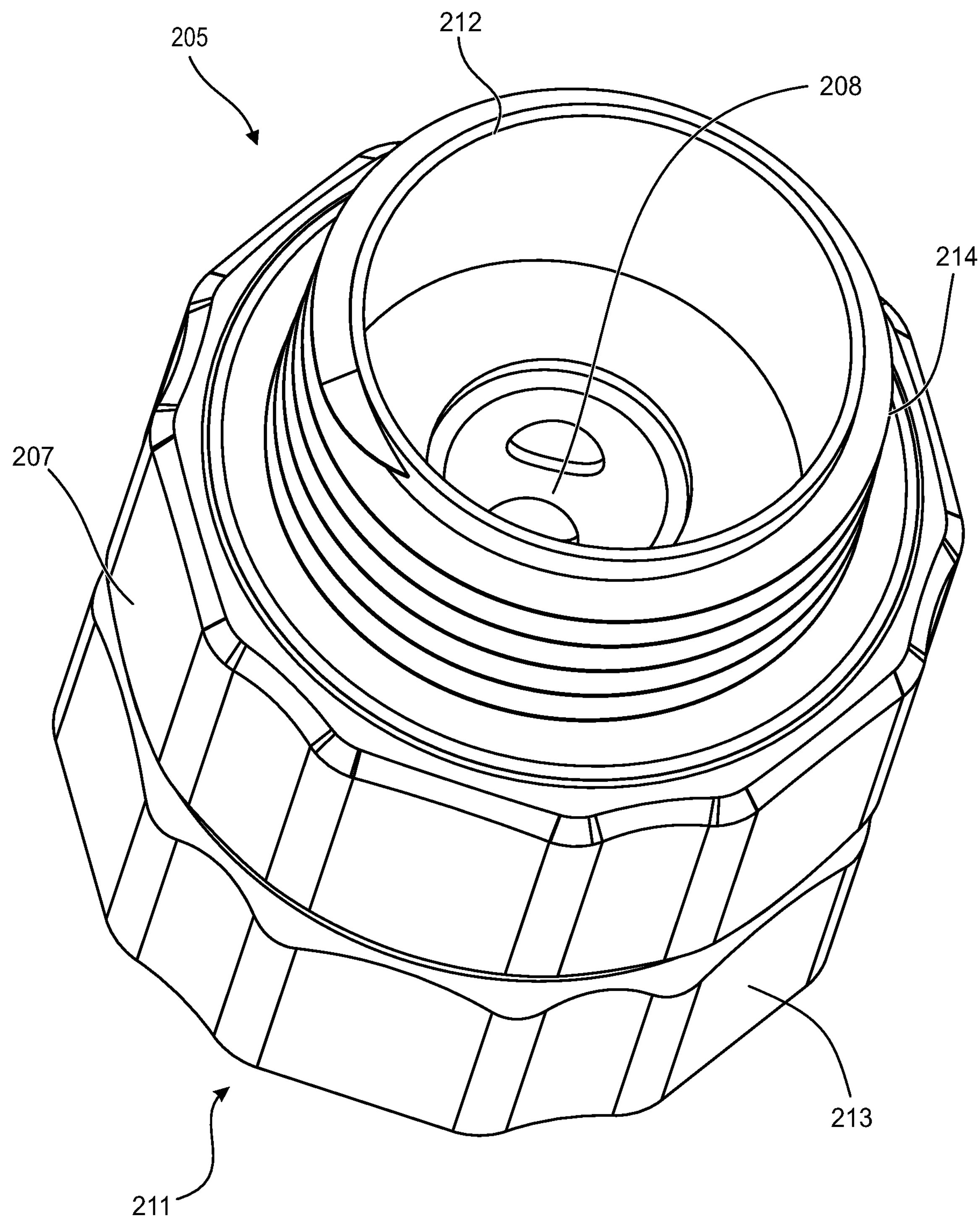
FIG. 11 is an alternate perspective view of the embodiment of the hose mending device shown in FIG. 10.
Figure 12:
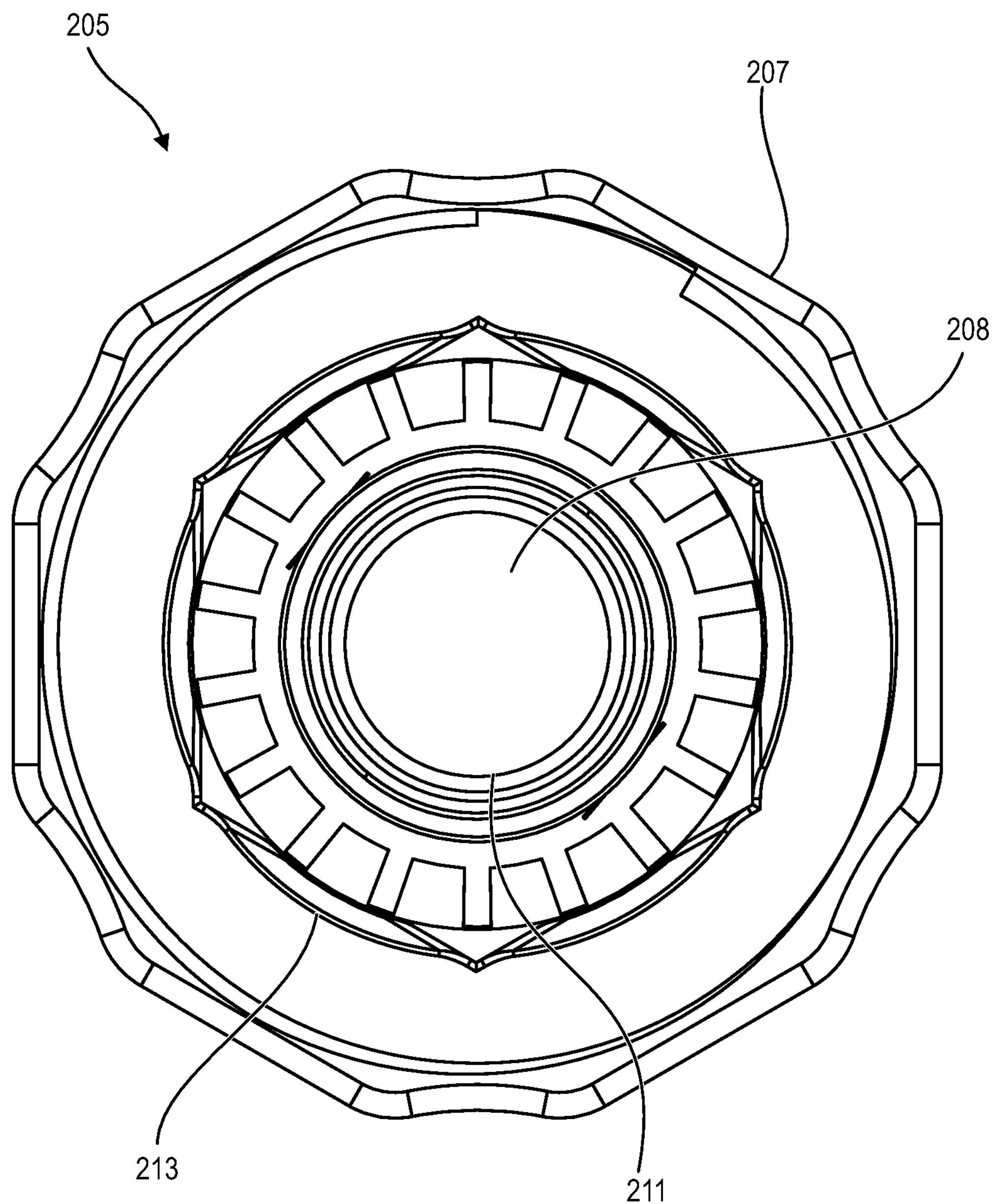
FIG. 12 is a top view of the embodiment of the hose mending device shown in FIG. 10.
Figure 13:
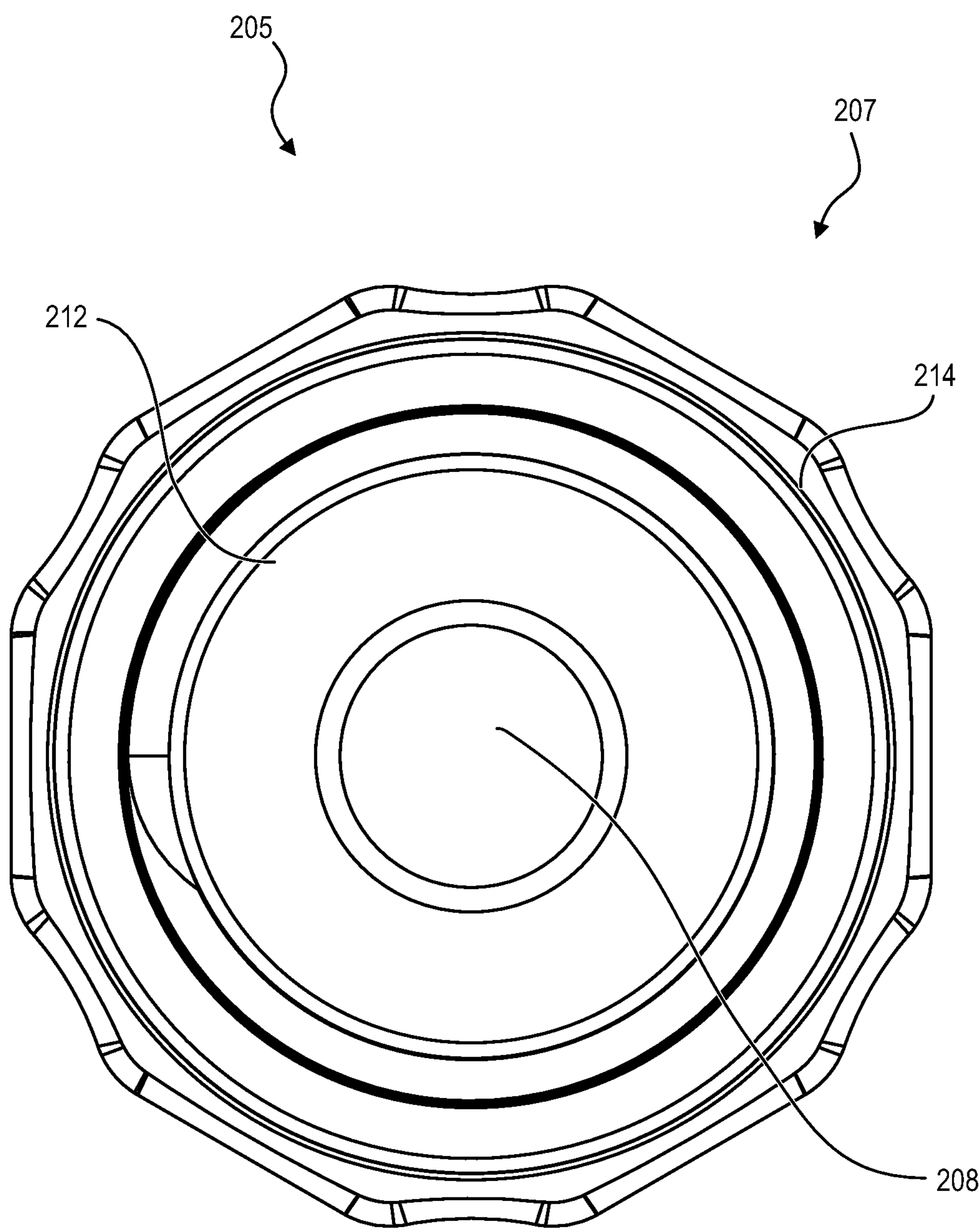
FIG. 13 is a bottom view of the embodiment of the hose mending device shown in FIG. 10.
Figure 14:
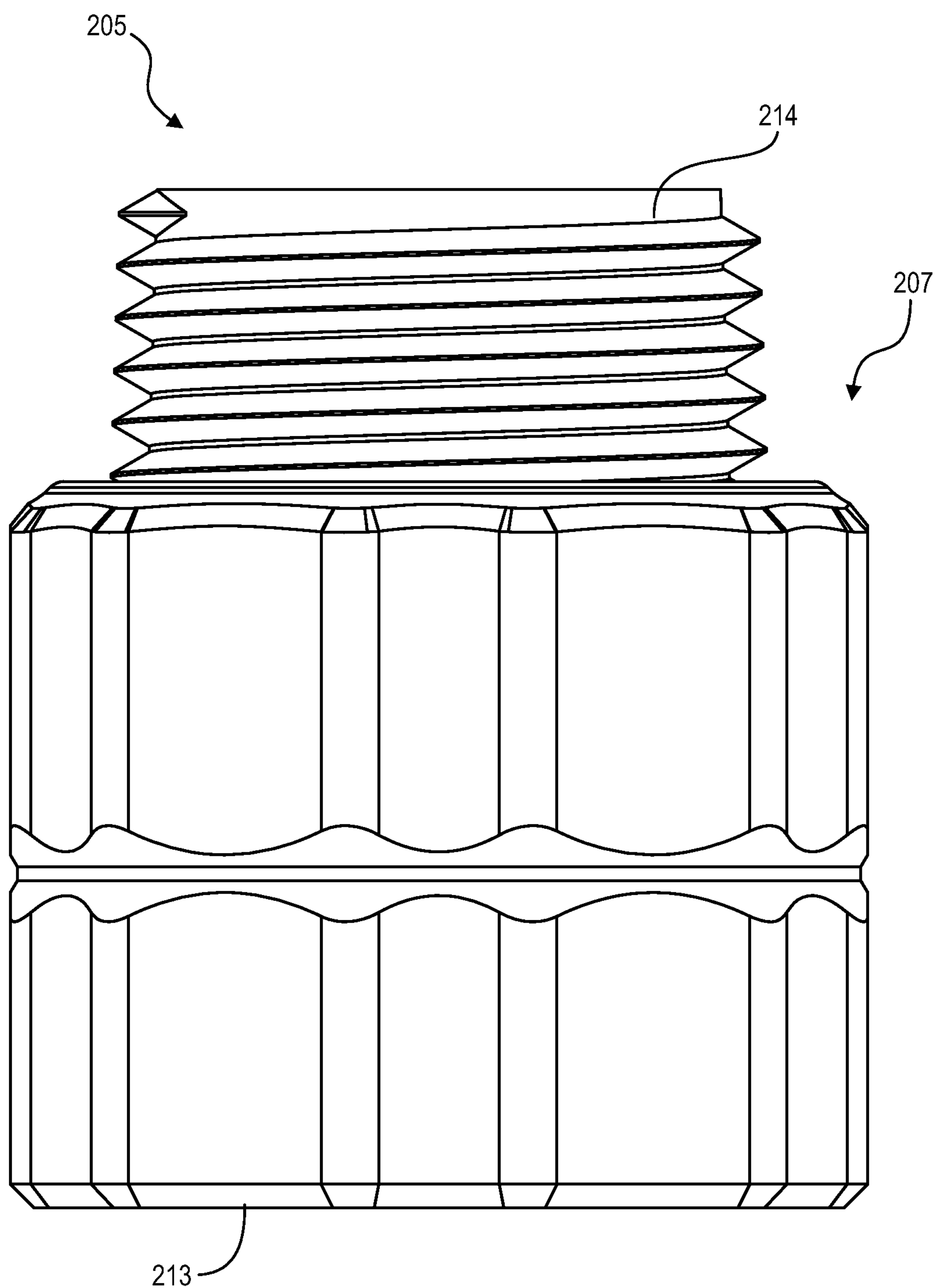
FIG. 14 is a side view of the embodiment of the hose mending device shown in FIG. 10.

With reference specifically to FIG. 10 and with reference generally to FIGS. 11-14, a first embodiment of a hose mending device 205 is shown. The parts, features and components identified by reference numerals in FIGS. 10-14 are not necessarily visible in each of these figures; instead, the reference numeral will be used where a component part, feature, or component is identified by a reference number at least once within this group of figures. The hose mending device 205 may comprise a peripheral body 207. The peripheral body 207 does not necessarily involve a single physically discrete component, but may involve a plurality of physically discrete components, as will be discussed subsequently. The peripheral body 207 circumscribes a chamber 208 and further circumscribes a first opening 211 and a second opening 212. The chamber 208 places the first opening 211 in fluid communication with the second opening 212. The hose mending device 205 may further comprise a first coupling 213 and a second coupling 214. The couplings 213, 214 may be used to engage with one or more fluid conveying devices. A fluid conveying device may comprise, for example, a hose nozzle, a sprinkler, a hose, or other type of conduit. The first coupling 213 may be used to engage an open end of a hose or conduit that has been damaged. The damaged portion of the hose may be removed, leaving an open end of the hose. The open end of the hose may be inserted into and secured to the first coupling, as will be explained subsequently.

Figure 15:
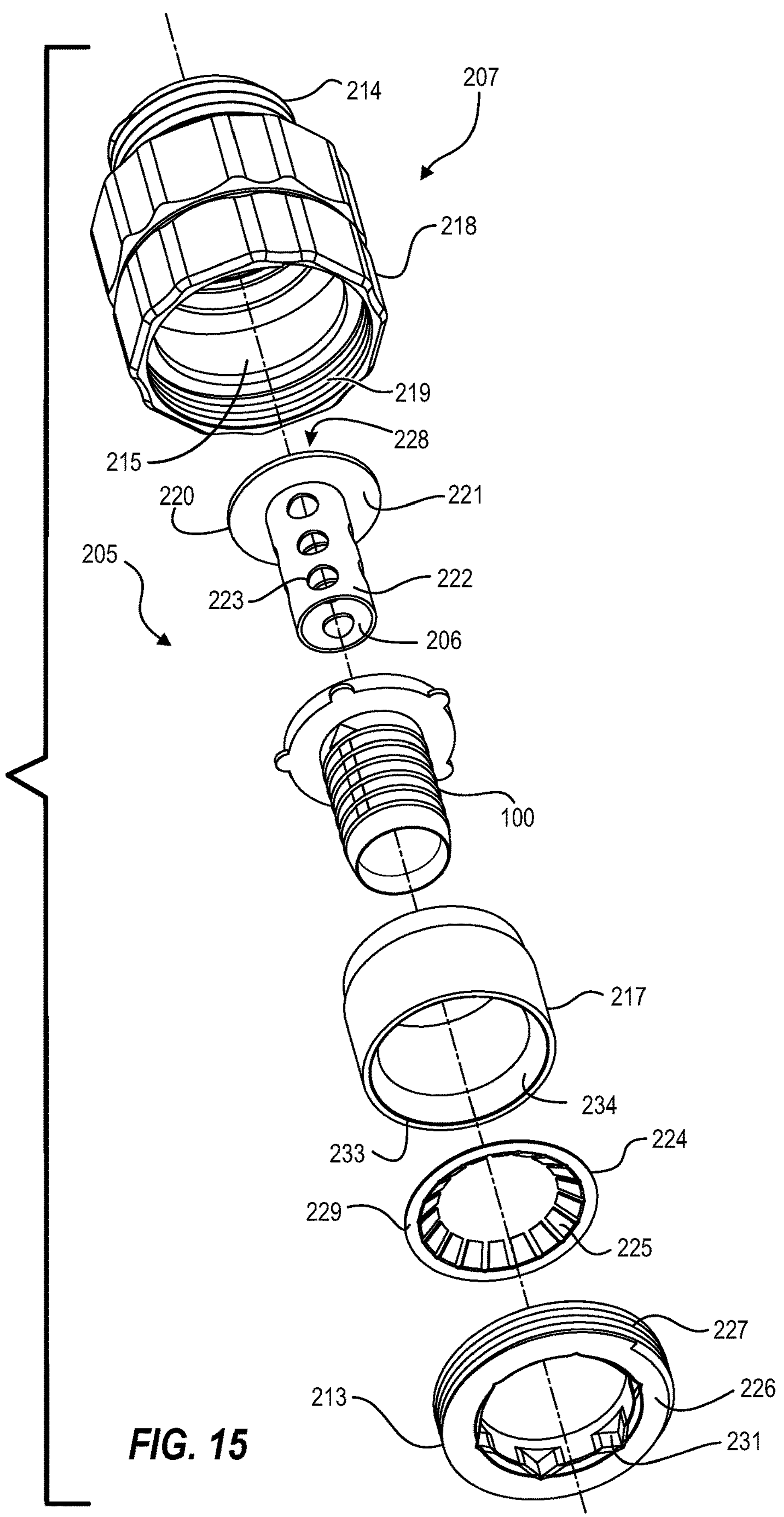
FIG. 15 is an exploded perspective view of the embodiment of the hose mending device shown in FIG. 10.
Figure 16:
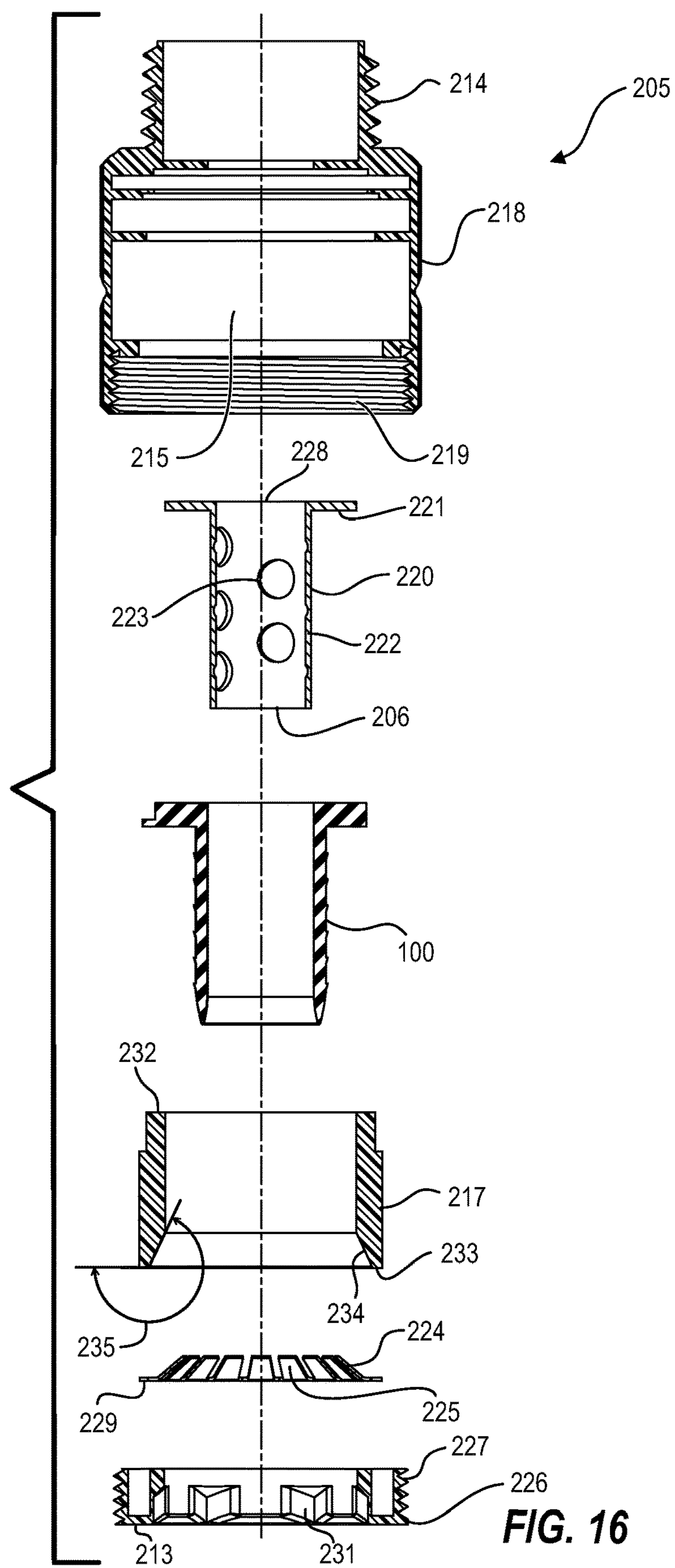
FIG. 16 is an exploded cross-sectional view of the embodiment of the hose mending device shown in FIG. 10.

FIGS. 15 and 16 depict the individual components of the embodiment of the hose mending device 205 shown in FIG. 10. In particular, these figures illustrate an outer shell 218, a support cage 220, a seal member 100, a support cylinder 217, a ring of gripping teeth 224 and an annular lid 226.

The outer shell 218 may be generally cylindrical in shape with a central passageway 215 extending from one end of the outer shell 218 to the other. The outer shell 218 provides support and structure for receiving other components of the hose mending device 205.

The second coupling 214 may comprise a threaded male coupling 214 for engaging a threaded female coupling.

It should be noted that the hose mending device 205 shown in FIGS. 11-14 has a generally linear shape. However, in alternative embodiments, the hose mender may, for example, be generally in an "L" shape.

Referring now collectively to FIGS. 15 and 16, the outer shell 218 may be integrally formed with the male coupling 214. In an alternative embodiment, the outer shell 218 may be separately formed and attached to the male coupling 214 using, for example, adhesives or ultrasonic or spin welding.

The outer shell 218 also includes inward threads 219 for receiving the outward threads 227 of the annular lid 226.

The outer shell 218 may be made in whole or in part, for example, of a polymer, such as ABS (Acrylonitrile-Butadiene-Styrene), or a metal, such as Zinc.

The support cage 220 may comprise a support cage disk 221 and a support cage cylinder 222. The support cage disk 221 includes a disk opening 228 that is aligned with a central channel 206 within the support cage cylinder 222. The support cage cylinder 222 includes a series of one or more support cage lateral openings 223.

The support cage 220 provides support for the seal member 100 and, thus, prevents the seal 100 from collapsing due to pressure fluctuations associated with use of the hose mending device 205, particularly when a ball-valve is used in close proximity on the pertinent fluid line.

In one embodiment, the support cage 220 is made from metal, such as zinc, stainless steel or brass. Accordingly, the support cage lateral openings 223 may be employed, for example, to reduce the weight of the support cage 220 while still providing the desired structural support. In an alternative embodiment, the support cage 220 may be made from a strong polymer. However, in some cases, the thickness of the polymer needed to provide the appropriate support could potentially be sufficient to reduce flow through the hose mending device 205.

The seal member 100 and variations thereof are discussed in FIGS. 1-9 herein and in other sections of the present application. Those portions are hereby incorporated by reference to this portion of the application. As discussed previously, the seal member 100 may be made, for example, from EPDM rubber (ethylene propylene diene monomer (M-class) rubber), for example, with a Shore A durometer greater than or equal to 70 and less than or equal to 85 or, alternatively, less than or equal to 75 and less than 85.

Still referring collectively to FIGS. 15 and 16, the support cylinder 217 is generally in the shape of a cylinder (more specifically, generally in the shape of a cylindrical shell). The support cylinder 217 may comprise a support cylinder proximal end 232 (the end of the support cylinder closest to the seal member 100) and a support cylinder distal end 233. The support cylinder 217 may have a cross-sectional angled face 234 which is disposed at a cross-sectional angle 235 greater than 180° and less than 270° relative to the support cylinder distal end 233. As illustrated in FIG. 16, the cross-sectional angle 235 may, alternatively, be between 240° and 250° and in various embodiments may be about 244°.

The ring of gripping teeth 224 may comprise a peripheral annular member 229 connected to a series of inward disposed teeth 225. When the hose mender is assembled, a portion of the peripheral annular member 229 is disposed on the support cylinder distal end 233, while the angled face 234 provides support for the series of inward disposed teeth 225. If the teeth 225 were allowed to flex beyond the angled face 234, the teeth 225 could become parallel with the exterior surface of the inserted conduit (e.g. a hose), and could thus fail to grip the conduit. In one embodiment, the ring of gripping teeth 224 may be made from metal, such as stainless steel.

The annular lid 226, as indicated above, may comprise a series of outward threads 227 and engage the inward threads 219 of the outer shell 218. The annular lid 226, as its name indicates, may be generally annular in shape. The annular lid 226 may also comprise one or more inward tool recesses 231 for receiving a tool used to rotate the annular lid 226 to secure the annular lid 226 to the outer shell 218 using outward threads 227 and inward threads 219.

Figure 17:
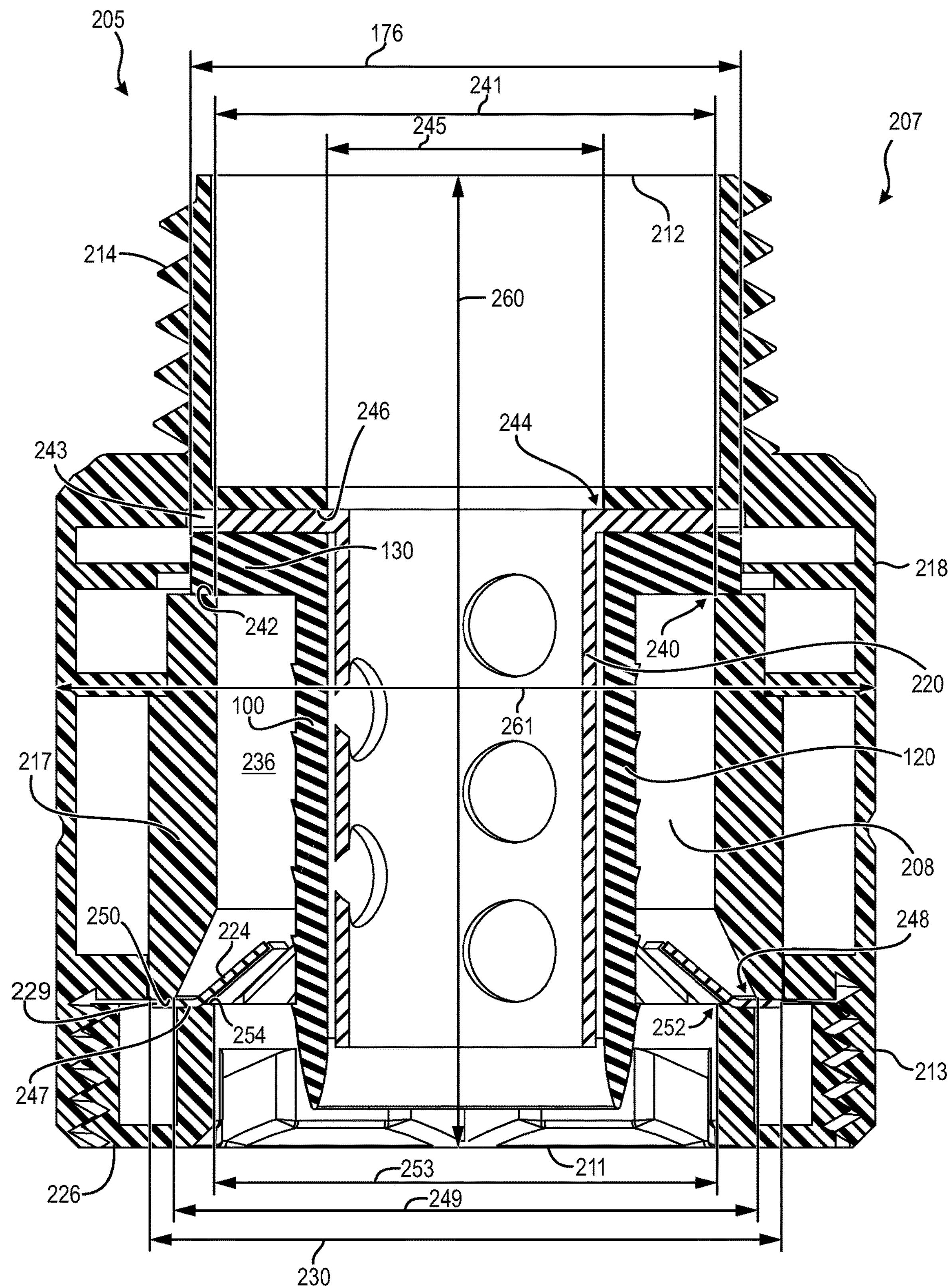
FIG. 17 is a cross-sectional view of the embodiment of the hose mending device shown in FIG. 10.

Referring now to FIG. 17, a cross-sectional view of the hose mending device 205 in an assembled and resting state illustrated in FIG. 10 is provided. The resting state of the hose mending device 205 refers to the state of the hose mending device 205 in which neither the seal member 100 nor ring of teeth 224 has been altered from its default position by an outside force, such as a conduit.

As shown in FIG. 17, the peripheral body 207 circumscribes a chamber 208. The chamber 208 places the first opening 211 in fluid communication with the second opening 212. The chamber 208 is fluid-tight when fluid-conveying devices are coupled to the first and second couplings 213, 214 in a fluid-tight manner.

The chamber 208 may comprise a chamber dimension 260 extending within the chamber between the first opening 211 and the second opening 212. A radial dimension 261 is disposed at a perpendicular angle with respect to the chamber dimension 260.

The peripheral body 207 may comprise at least four radially inward projecting ledges 242, 246, 250, 254 that circumscribe a first and a second circumferential recess 243, 247. Thus, in the specific version of the hose mending device 205 shown in FIG. 17, the peripheral body 207 may comprise the outer shell 218, the support cylinder 217, and the annular lid 226.

As illustrated, the first radially inward projecting ledge 242 may comprise the support cylinder proximal end 232 (labeled as such in FIG. 16). The second radially inward projecting ledge 246 may comprise a radially inward projection of the outer shell 218. The first radially inward projecting ledge 242 circumscribes a first aperture 240 having a first aperture dimension 241 intermediate opposing sides of the first aperture 240. The second radially inward projecting ledge 246 circumscribes a second aperture 244 having a second aperture dimension 245 intermediate opposing sides of the second aperture 244. The first radially inward projecting ledge 242 and the second radially inward projecting ledge 246 circumscribe the first circumferential recess 243.

As discussed previously, the annular portion 130 may comprise an annular portion outer dimension 176 extending between opposing sides of the annular portion exterior surface 156. The annular portion outer dimension 176 is greater than the first aperture dimension 241 and the second aperture dimension 245 such that the annular portion 130 may be retained within the first circumferential recess 243.

It should be noted here that since the seal member 100 is made of a relatively soft and flexible material, the seal member 100 could potentially be deformed when under pressure such that the annular portion 130 of the seal member 100 could be displaced from the second circumferential recess 247. However, the support cage 220 provides rigid support to both the annular portion 130 and the cylindrical portion 120 to mitigate or eliminate the risk of a deformation of the annular portion 130 and cylindrical portion 120.

As illustrated in FIG. 17, the third radially inward projecting ledge 250 may comprise the support cylinder distal end 233 (labeled as such in FIG. 16). The fourth radially inward projecting ledge 254 may comprise a radially inward projection of the annular lid 226 or, more specifically, a radially inner, proximal edge of the annular lid 226. The third radially inward projecting ledge 250 circumscribes a third aperture 248 having a third aperture dimension 249 intermediate opposing sides of the third aperture 248. The fourth radially inward projecting ledge 254 circumscribes a fourth aperture 252 having a fourth aperture dimension 253 intermediate opposing sides of the fourth aperture 252. The third radially inward projecting ledge 250 and the fourth radially inward projecting ledge 254 circumscribe the second circumferential recess 247. As the third aperture dimension 249 and fourth aperture dimension 253 are less than the peripheral annular member outer dimension 230 (i.e., the outer dimension of the peripheral annular member 229 of the ring of gripping teeth 224, which comprises the outer dimension of the ring of gripping teeth 224), the second circumferential recess 247 retains the ring of gripping teeth 224.

The configuration of the hose mending device 205 makes assembly a simple process. Because the support cylinder 217, a portion of which may comprise the first radially inward projecting ledge 242, is removable from the outer shell 218, during assembly, the seal member 100 and support cage 220 may be positioned within the chamber 208 adjacent to the second radially inward projecting ledge 246 such that the annular portion 130 is positioned within the first circumferential recess 243. Thereafter, the ring of gripping teeth 224 may be positioned on the support cylinder 217 and the annular lid 226 may be secured to the outer shell 218, and a portion of the peripheral annular member 229 of the ring of gripping teeth 224 may be positioned within the second circumferential recess 247.

In the resting state or condition, as illustrated in FIG. 17, the chamber may comprise a peripheral recess 236, which is sized and shaped to receive an end of a conduit ledge (e.g., a hose) of a particular size. Accordingly, the peripheral recess 236 has generally the shape of a conical shell.

The first coupling 213, shown in FIG. 17, may comprise the ring of gripping teeth 224; the seal member 100; the support cage 220; the support cylinder 217 (which may comprise the first and third radially inward projecting ledges 242, 250 and the radially inward disposed surfaces of the support cylinder 217 that circumscribes a portion of the peripheral recess 236); the second radially inward projecting ledge 246 (which may comprise a portion of the outer shell 218); and the annular lid 226 (which may comprise inward disposed surfaces that circumscribe a portion of the peripheral recess 236 and the fourth radially inward projecting ledge 254).

Figure 18A:
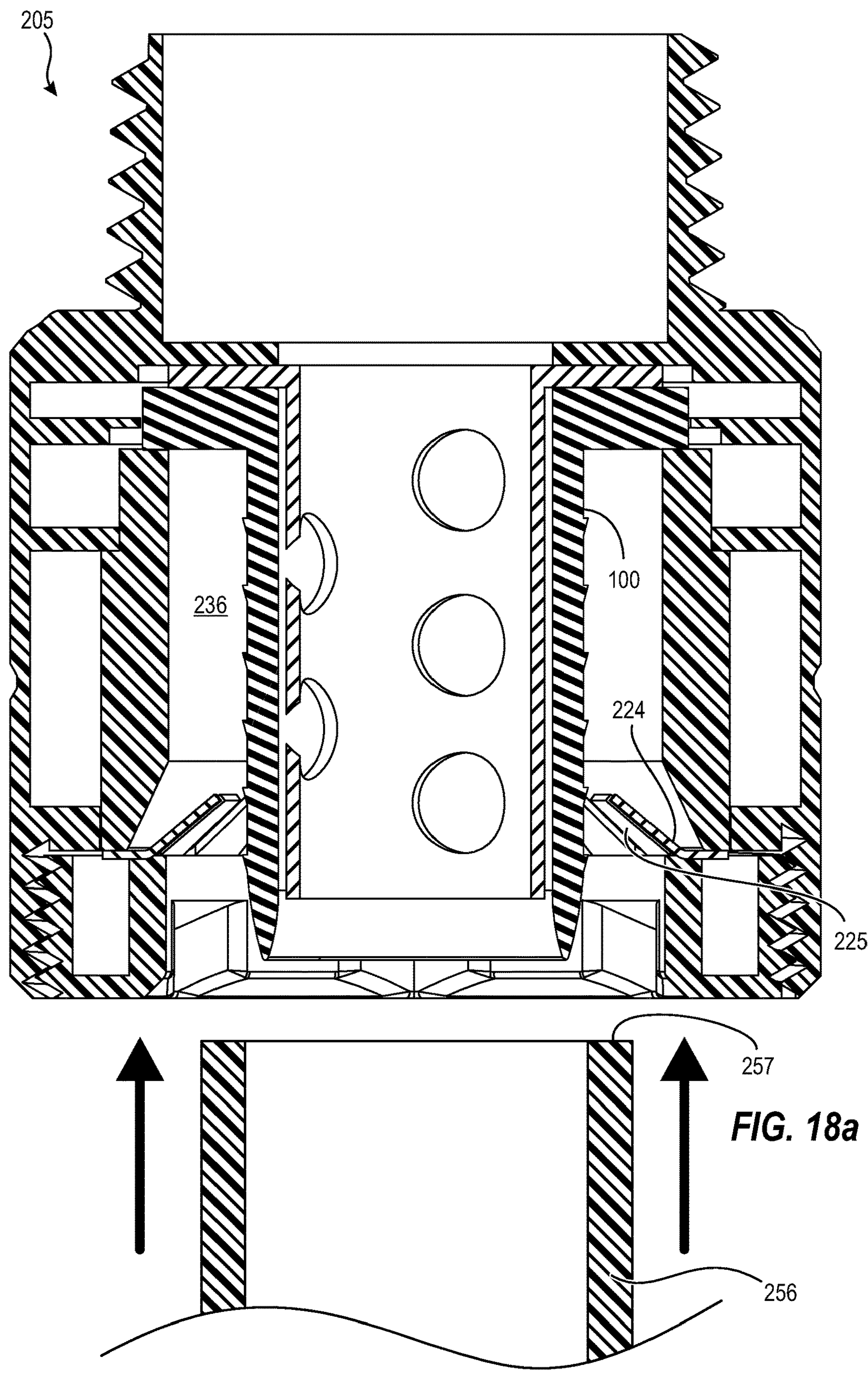
FIGS. 18A-D illustrate a sequence of steps for attaching fluid conveying devices to the embodiment of the hose mending device shown in FIG. 10.

FIGS. 18A-D illustrate the process of securing a fluid conveying device (e.g., a conduit 256, hose faucet, or spray nozzle) to the hose mending device 205. As illustrated in FIG. 18A, a conduit proximal end 257 may be moved in the direction identified by the arrows in FIG. 18A toward the peripheral recess 236. Events prior to the steps illustrated in FIG. 18A may involve, for example, cutting off a damaged end of a conduit 256, leaving the conduit proximal end 257 without a coupling. As shown in FIG. 18A, the hose mending device 205 is in a resting condition in which neither the seal member 100 nor the teeth 225 of the ring of gripping teeth 224 are displaced from their default condition.

Figure 18B:
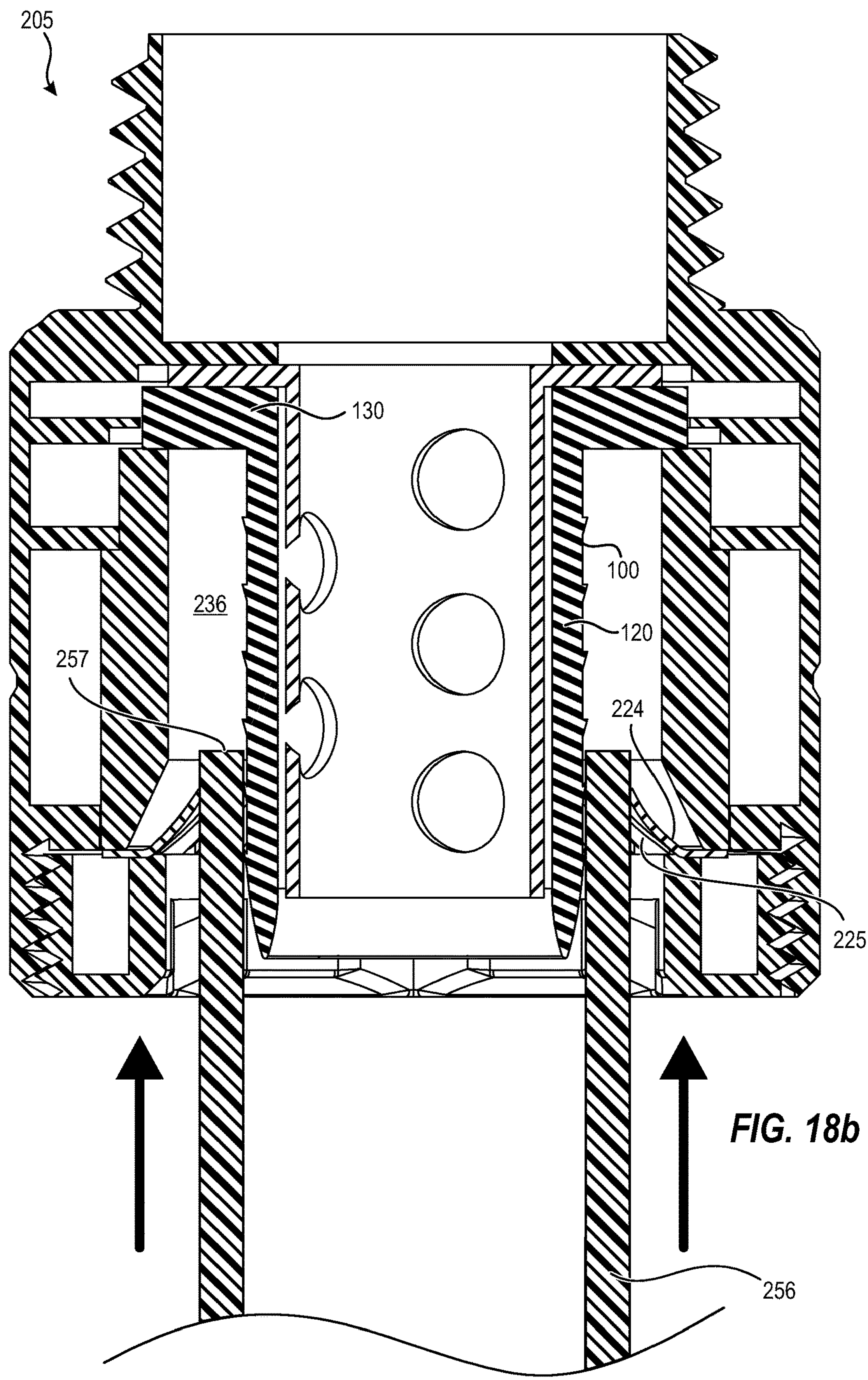

In FIG. 18B, the conduit proximal end 257 is positioned within the peripheral recess 236 such that the teeth 225 of the ring of gripping teeth 224 have been deformed by contact with the conduit 256. Also, the seal member 100 has been slightly deformed by the contact with the conduit 256 (i.e., some of the annular protrusions 126 of the seal member 100 have been deformed).

Figure 18C:
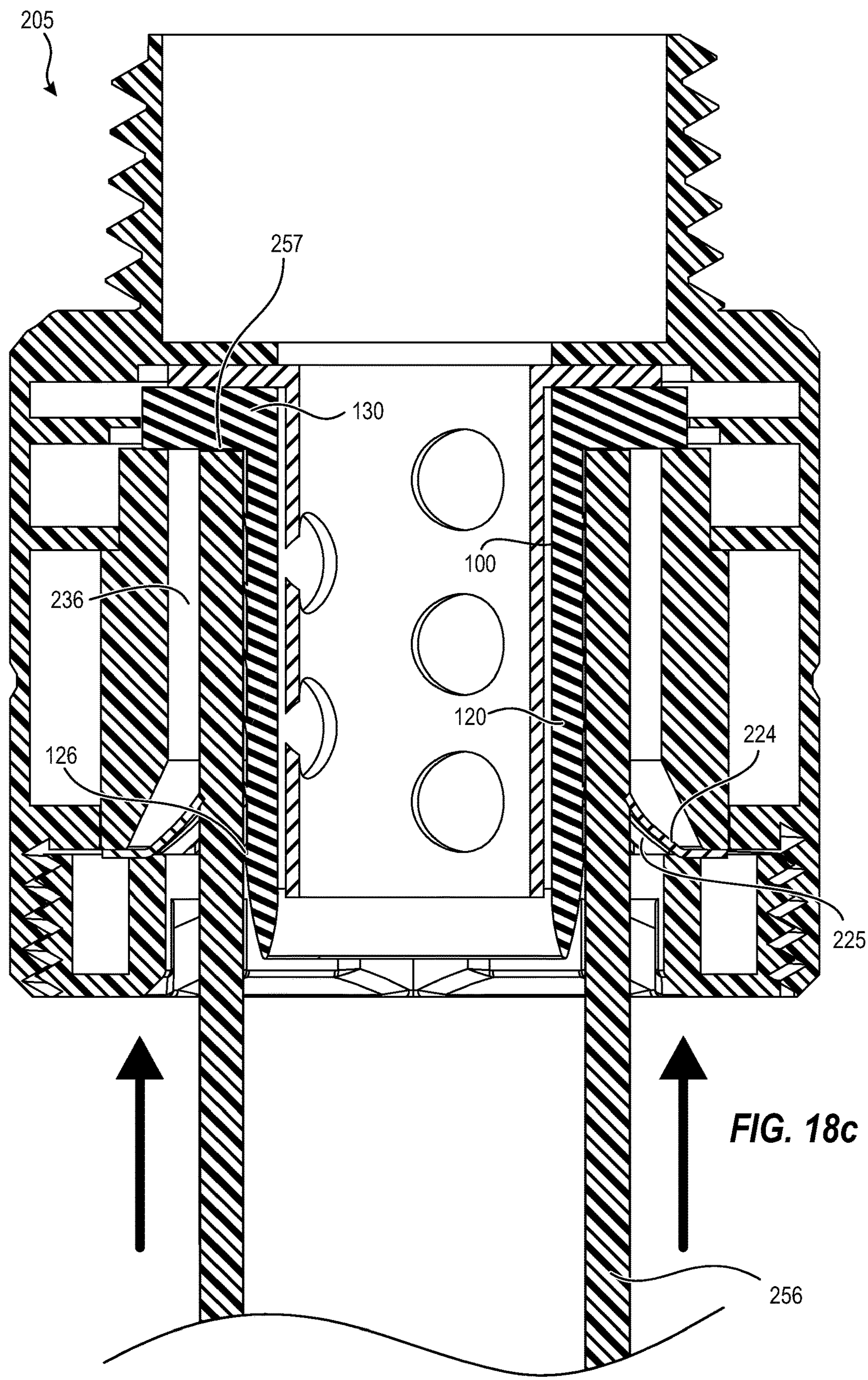

In FIG. 18C, the conduit 256 has been fully inserted into the peripheral recess 236 such that the conduit proximal end 257 has contacted the annular portion 130 of the seal member 100 in a sealing, fluid-tight engagement. Each of the annular protrusions 126 is now engaged with the interior surface of the conduit 256. The teeth 225 of the ring of gripping teeth 224 have penetrated the exterior surface of the conduit 256, thus retaining the conduit 256 within the peripheral recess 236. The flexibility and resiliency of the seal member 100 enable a fluid tight engagement between the conduit 256 and the seal member 100 even when the conduit 256 is slightly displaced. The support cage 220 provides support to the seal member 100 such that it cannot be displaced to a point that the conduit 256 could be disengaged from one or more of the teeth 225. It should be noted that the sealing engagement of the hose mending device 205 is achieved without a single O-ring seal.

It should also be noted that the sealing engagement between the conduit 256 and the hose mending device 205 occurs although the conduit 256 is devoid of grooves, flanges, or beads near the conduit proximal end 257 or anywhere on the conduit 256.

Figure 18D:
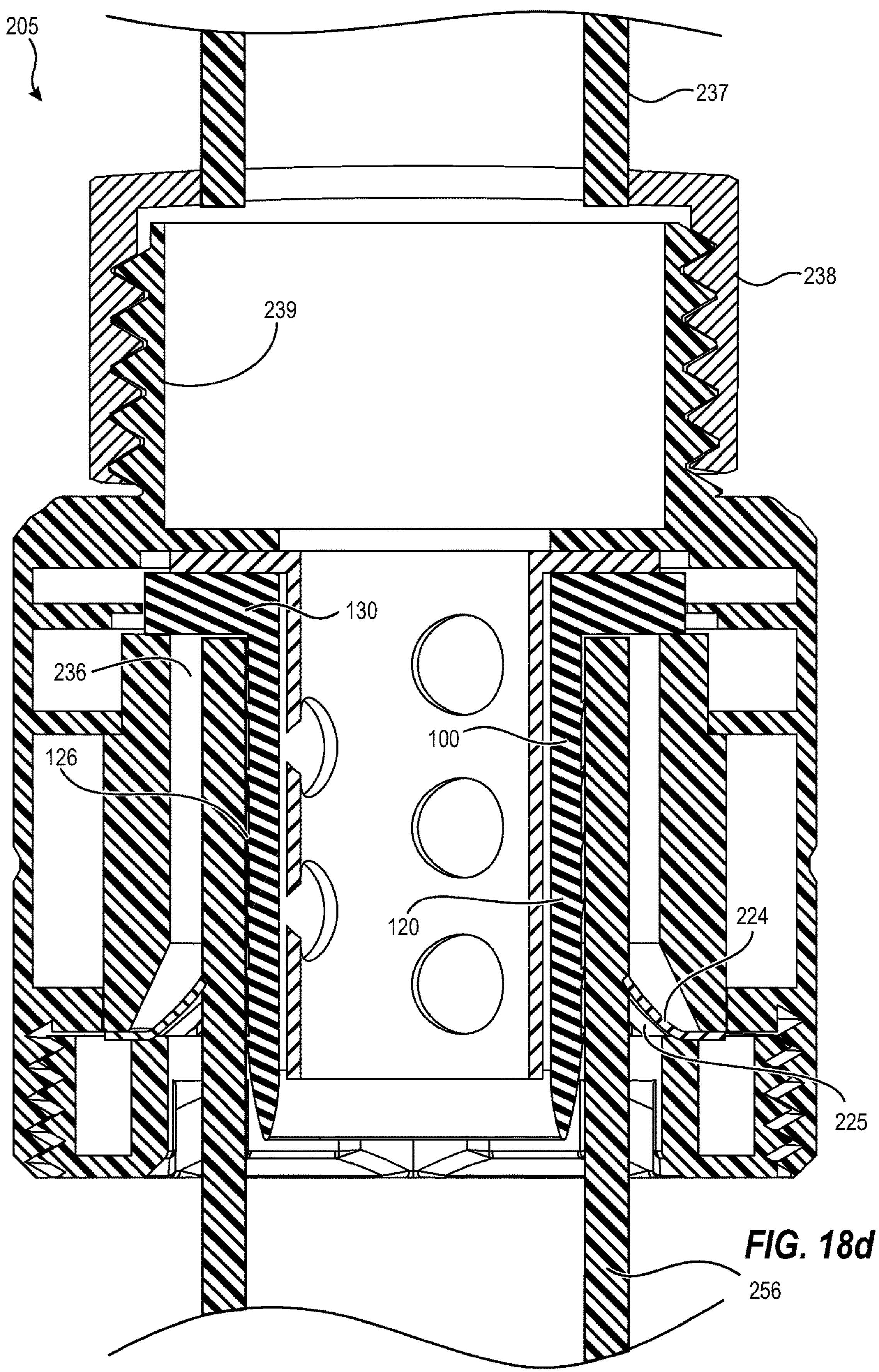

In FIG. 18D, the male coupling 239 is shown in an engaged position with respect to the female coupling 238 of a hose 237, which may comprise one type of a fluid conveying device.

Figure 19:
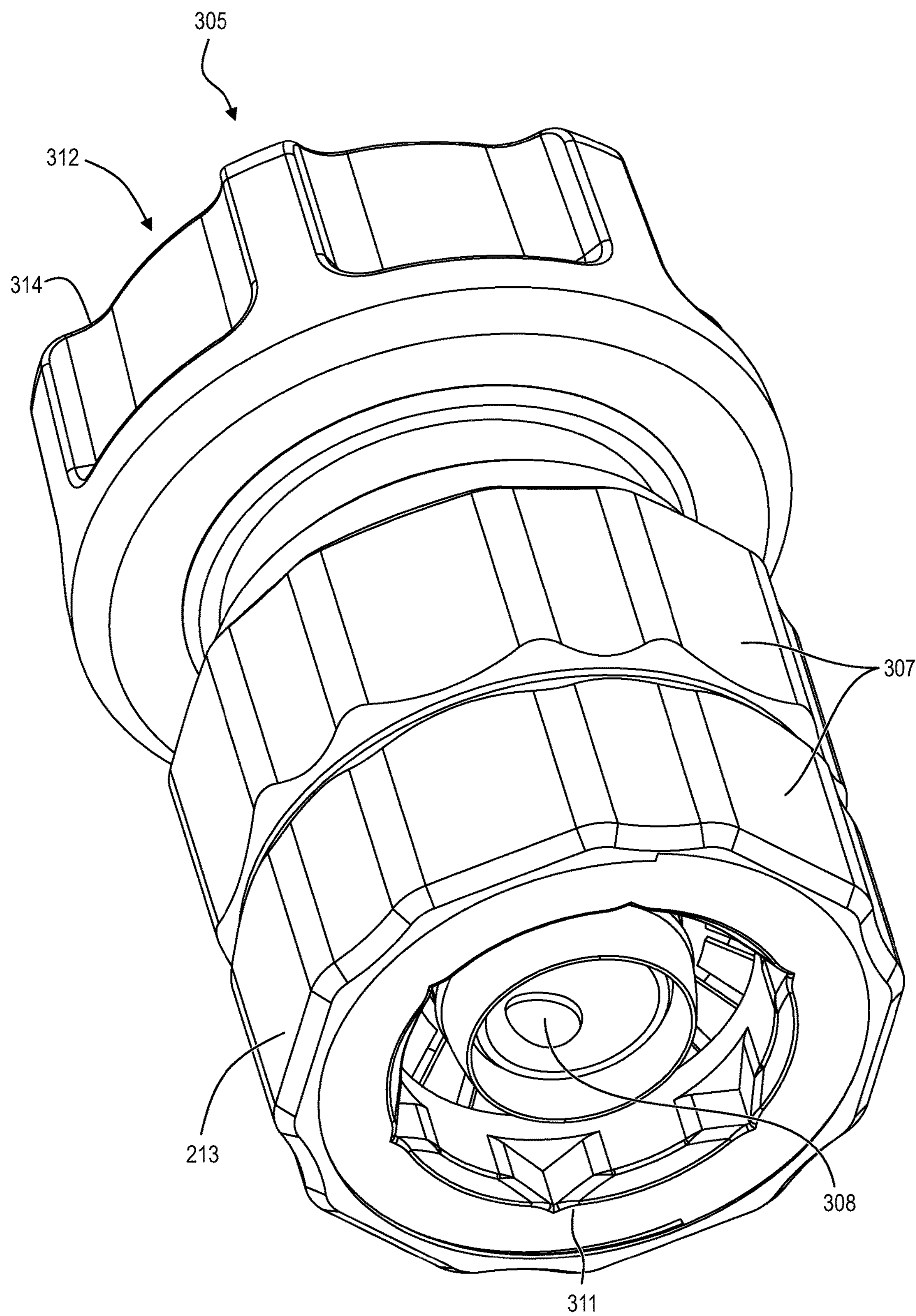
FIG. 19 is an elevated perspective view of a second embodiment of a hose mending device.

FIG. 19 provides a perspective view of a second embodiment of the hose mending device 305. As with the first embodiment of the hose mending device 205 illustrated, for example, in FIG. 10, the hose mending device 305 may comprise a peripheral body 307 circumscribing a chamber 308. The chamber 308 places a first opening 311 in fluid communication with a second opening 312. The illustrated embodiment of the hose mending device 305 may further comprise a first coupling 213 positioned at one end of the hose mending device 305, and a second coupling 314 positioned at an opposite end of the hose mending device 305. In this embodiment, the second coupling 314 may comprise a female coupling 314.

Figure 20:
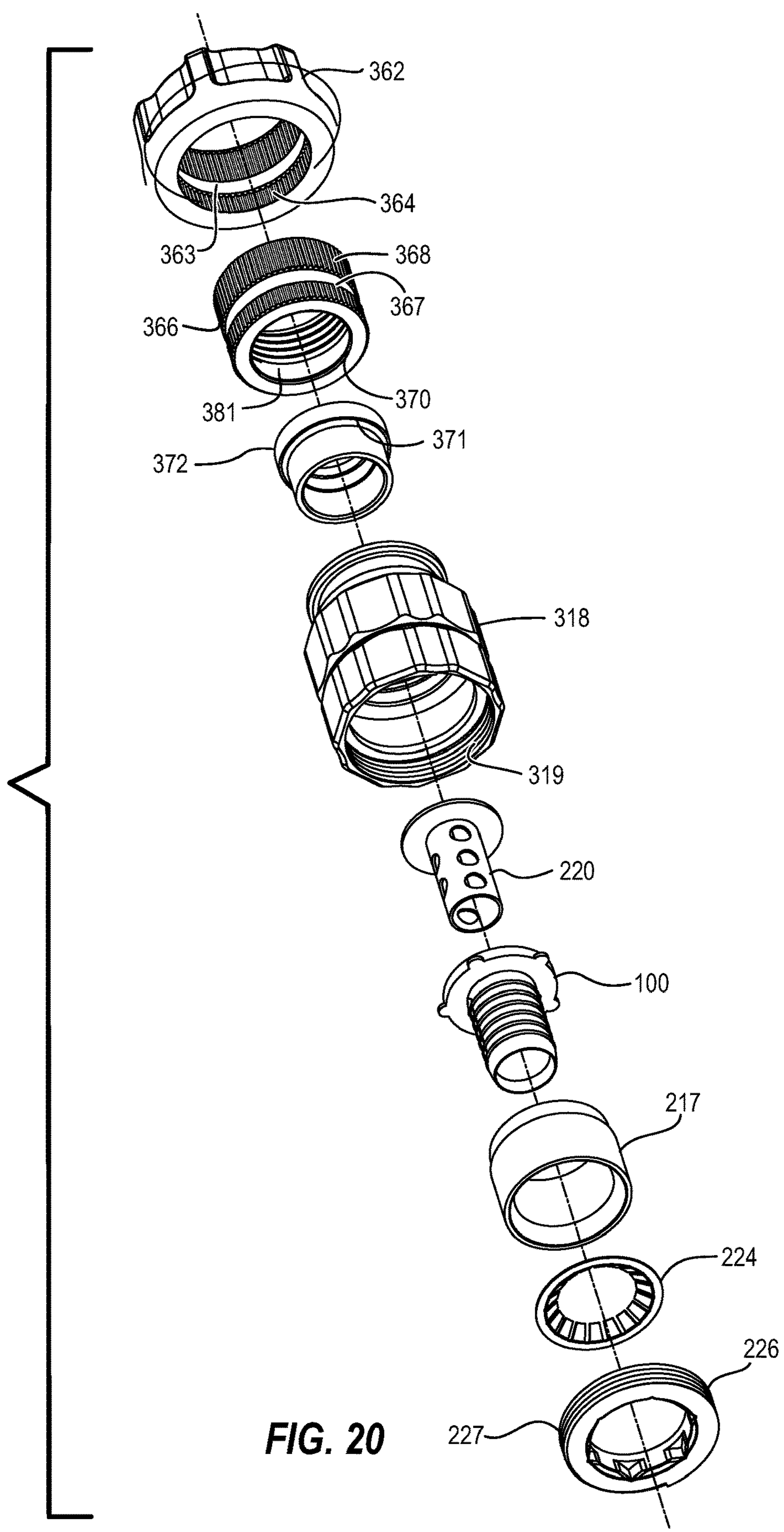
FIG. 20 is an exploded perspective view of the embodiment of the hose mending device shown in FIG. 19.
Figure 21:
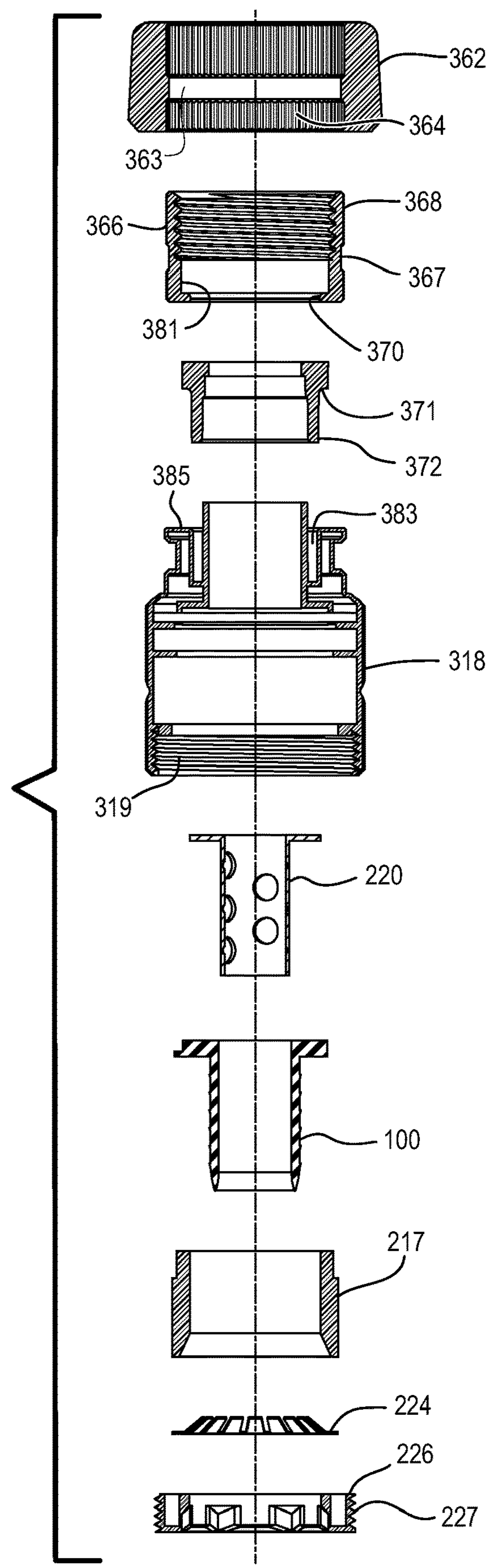
FIG. 21 is an exploded cross-sectional view of the embodiment of the hose mending device shown in FIG. 19.

Referring collectively to FIGS. 20 and 21, exploded views of the components of the embodiment of the hose mending device 305 illustrated in FIG. 19 are provided. The hose mending device 305 may comprise a gripping sheath 362, an internal threaded circumferential member 366, a linking circumferential member 372, an outer shell 318, the support cage 220, the seal member 100, the support cylinder 217, the ring of gripping teeth 224, and the annular lid 226. The seal member 100, support cylinder 217, the ring of gripping teeth 224 and the annular lid 226 have been discussed previously. In the interest of brevity, the features of these components will not be discussed again.

The gripping sheath 362 may have a passageway with a series of inward projecting ridges 364 and a circumferential protrusion 363. The gripping sheath 362 may be made, for example, of thermoplastic rubber (TPR) and provides a good shape and surface to be grasped and rotated by a user.

The internal threaded circumferential member 366 may comprise a circumferential depression 367 shaped to receive and engage the circumferential protrusion 363 of the gripping sheath 362. The internal threaded circumferential member 366 also may comprise a series of outward projecting ridges 368 for engaging the inward projecting ridges 364 of the gripping sheath 362. The internal threaded circumferential member 366 also comprises a radially inward projecting lip 370. The internal threaded circumferential member 366 may be made of a polymer or of a metal material, such as brass.

The linking circumferential member 372 may comprise a radially outward projecting lip 371 for engaging the radially inward projecting lip 370 of the linking circumferential member 372. The engagement between the radially outward projecting lip 371 and the radially inward projecting lip 370 enables the gripping sheath 362 and the internal threaded circumferential member 366 to rotate relative to the remaining components of the hose mending device 305.

The outer shell 318 illustrated in FIGS. 20-21 comprises a circumferential slot 383 for receiving and being secured to a portion of the linking circumferential member 372 opposite the radially outward projecting lip 371 (i.e., the opposite portion 381) of the linking circumferential member 372. The outer shell 318 also includes inward threads 319 for receiving the outward threads 227 of the annular lid 226 and comprises a circular support surface 385 positioned radially outside of the circumferential slot 383 (shown only in FIG. 21).

Figure 22:
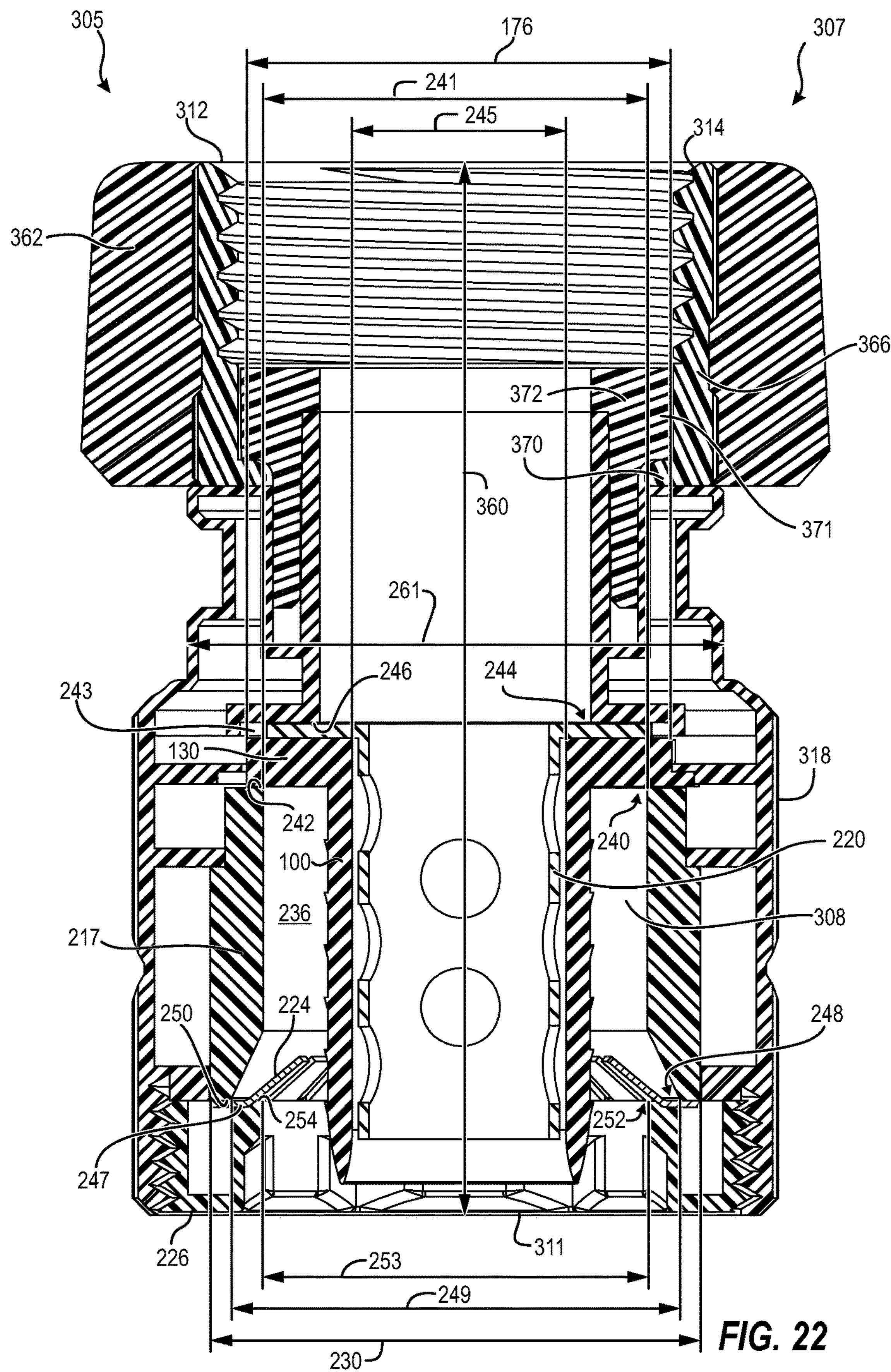
FIG. 22 is a cross-sectional view of the embodiment of the hose mending device shown in FIG. 19.

Referring now to FIG. 22, a cross-sectional view of the second embodiment of the hose mending device 305 illustrated in FIGS. 19-21 is provided. Like the first embodiment of the hose mending device 205 shown in connection with, for example, FIG. 17, the peripheral body 307 circumscribes a chamber 308. The chamber 308 places the first opening 311 in fluid communication with the second opening 312.

The chamber 308 may comprise a chamber dimension 360 extending within the chamber between the first opening 311 and the second opening 312. A radial dimension 361 is disposed at a perpendicular angle with respect to the chamber dimension 360. The second embodiment of the hose mending device 305 incorporates the first coupling 213 shown in the embodiment of the hose mending device 205 illustrated in FIG. 17. As indicated previously, the first coupling 213, shown in FIG. 22, may comprise the ring of gripping teeth 224; the seal member 100; the support cage 220; the support cylinder 217 (which may comprise the first and third radially inward projecting ledges 242, 250 and the radially inward disposed surfaces of the support cylinder 217 that circumscribe a portion of the peripheral recess 236); the second radially inward projecting ledge 246 (which may comprise a portion of the outer shell 318); and the annular lid 226 (which may comprise inward disposed surfaces that circumscribe a portion of the peripheral recess 236 and the fourth radially inward projecting ledge 254).

The first radially inward projecting ledge 242 circumscribes a first aperture 240 having a first aperture dimension 241 intermediate opposing sides of the first aperture 240. The second radially inward projecting ledge 246 circumscribes a second aperture 244 having a second aperture dimension 245 intermediate opposing sides of the second aperture 244. The first radially inward projecting ledge 242 and the second radially inward projecting ledge 246 circumscribe the first circumferential recess 243, in which the annular portion 130 may be retained.

As discussed previously, the annular portion 130 may comprise an annular portion outer dimension 176 extending between opposing sides of the annular portion exterior surface 156. The annular portion outer dimension 176 is greater than the first aperture dimension 241 and the second aperture dimension 245 such that the annular portion 130 may be retained within the first circumferential recess 243.

The third radially inward projecting ledge 250 circumscribes a third aperture 248 having a third aperture dimension 249 intermediate opposing sides of the third aperture 248. The fourth radially inward projecting ledge 254 circumscribes a fourth aperture 252 having a fourth aperture dimension 253 intermediate opposing sides of the fourth aperture 252. The third radially inward projecting ledge 250 and the fourth radially inward projecting ledge 254 circumscribe the second circumferential recess 247. As the third aperture dimension 249 and fourth aperture dimension 253 are less than the peripheral annular member outer dimension 230 (i.e., the outer dimension of the ring of gripping teeth 224). Thus, the first coupling 213 shown in FIG. 22 functions in the same way as the hose mending device 205 shown in FIG. 17 and as illustrated in connection with FIGS. 18A-C and includes a peripheral recess 236 for receiving and engaging a conduit 256.

As indicated previously, the second embodiment of the hose mending device 305 shown in FIG. 22 is different from the embodiment of the hose mending device 205 shown in FIG. 17 in that the second coupling 214 (a male coupling) has been replaced by a female coupling 314.

The second coupling 314 involves the gripping sheath 362, internal threaded circumferential member 366, the linking circumferential member 372, and the circumferential slot 383 and circular support surface 385 of the outer shell 318. Accordingly, in the second embodiment of the hose mending device 305, the internal threaded circumferential member 366 has been positioned within the gripping sheath 362. The radially outward projecting lip 371 has been positioned within a lower portion of the internal threaded circumferential member 366 such that the radially outward projecting lip 371 engages the radially inward projecting lip 370, thus enabling independent rotation of the gripping sheath 362 and the internal threaded circumferential member 366 relative to the remaining components of the hose mending device 305. The opposite portion 381 of the cylindrical linking member has been spun weld or otherwise attached within the circumferential slot 383 shown in FIG. 21. The radially inward projecting lip 370 of the internal threaded circumferential member 366 has been positioned such that it abuts the circular support surface 385 of the outer shell 318. Accordingly, the second coupling 314 involves the gripping sheath 362, internal threaded circumferential member 366, the linking circumferential member 372, and the circumferential slot 383 and circular support surface 385 of the outer shell 318.

Figure 23:
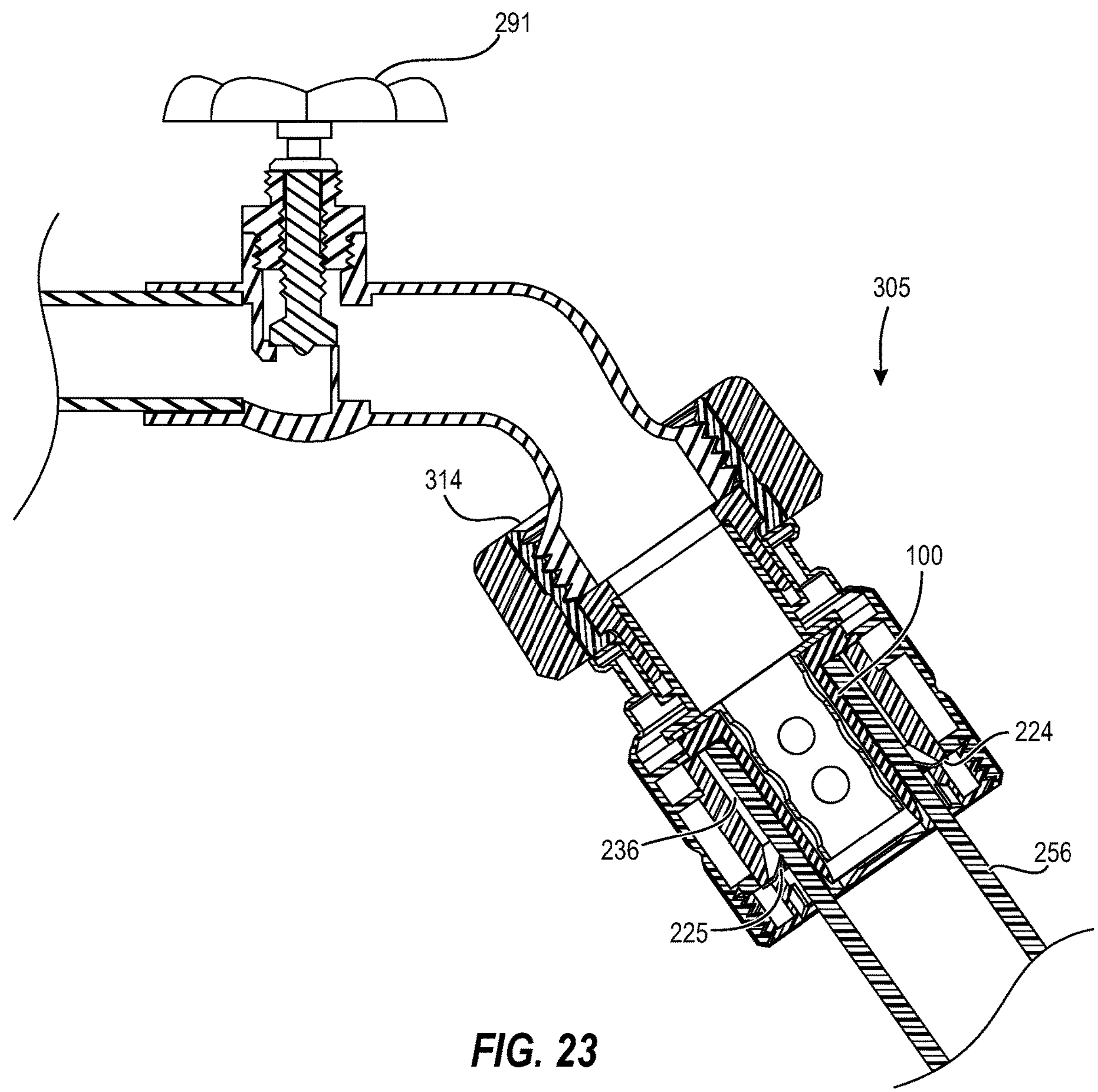
FIG. 23 provides a cross-sectional view of the embodiment of the hose mender shown in FIG. 19 in which the hose mender is attached to a hose faucet and conduit.

FIG. 23 provides a cross-sectional view of the second embodiment of the hose mending device 305 secured to a hose faucet 291 and to a conduit 256. As illustrated, internal threads of the second coupling 314, the female coupling, have been secured to the external threads of the hose faucet 291. Further, the conduit 256 is positioned within the peripheral recess 236 in a fluid-tight sealing engagement with the sealing member 100, and the teeth 225 of the ring of gripping teeth 224 have penetrated the exterior surface of the conduit 256 to retain the conduit 256 within the peripheral recess 236.

Figure 24:
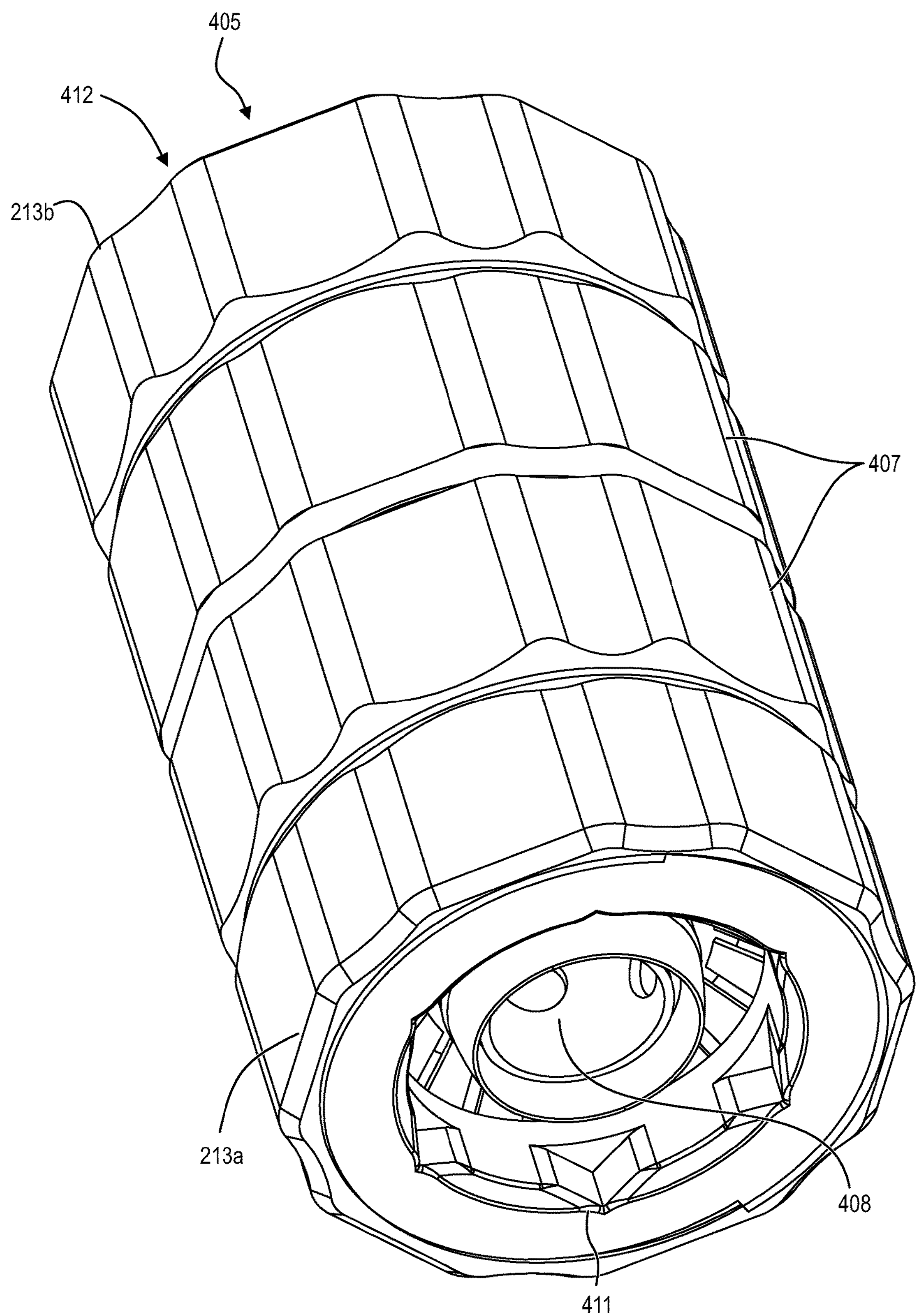
FIG. 24 is an elevated perspective view of a third embodiment of a hose mending device.

FIG. 24 is a perspective view of a third embodiment of the hose mending device 405. As with the prior two embodiments, the hose mending device 405 may comprise a peripheral body 407 that circumscribes a chamber 408. The chamber places a first opening 411 in fluid communication with a second opening 412. The third embodiment of the hose mending device 405 may comprise a first coupling 213*a* and a second coupling 213*b*. The first coupling 213*a* is structurally identical to the first coupling 213 utilized in the first and second embodiments of the hose mending device 205, 305. Furthermore, in this embodiment, the second coupling 213*b* is identical as well, except that the second coupling 213*b* is rotated and positioned on the opposite side of the hose mending device 405.

Figure 25:
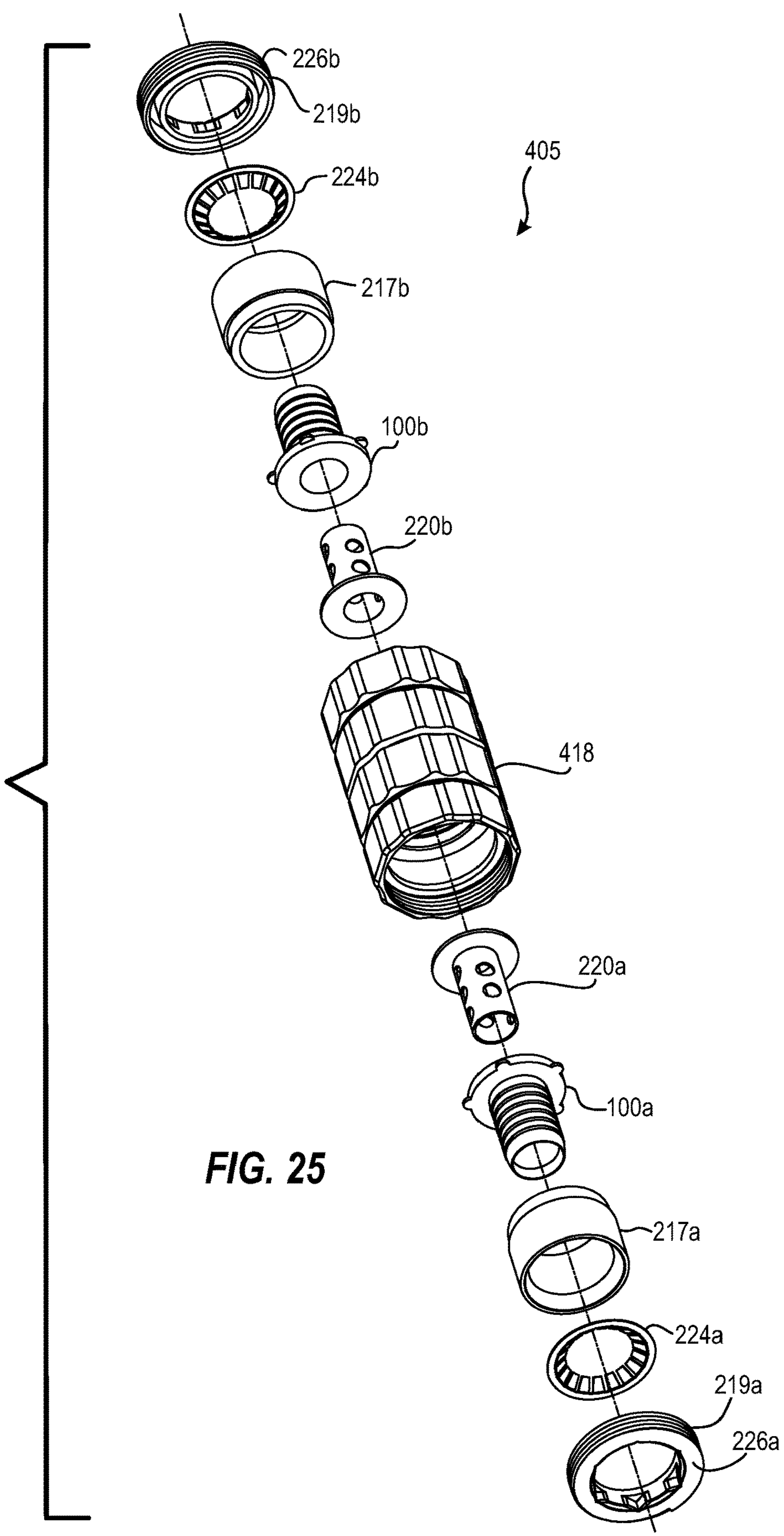
FIG. 25 is an exploded perspective view of the embodiment of the hose mending device shown in FIG. 24.
Figure 26:
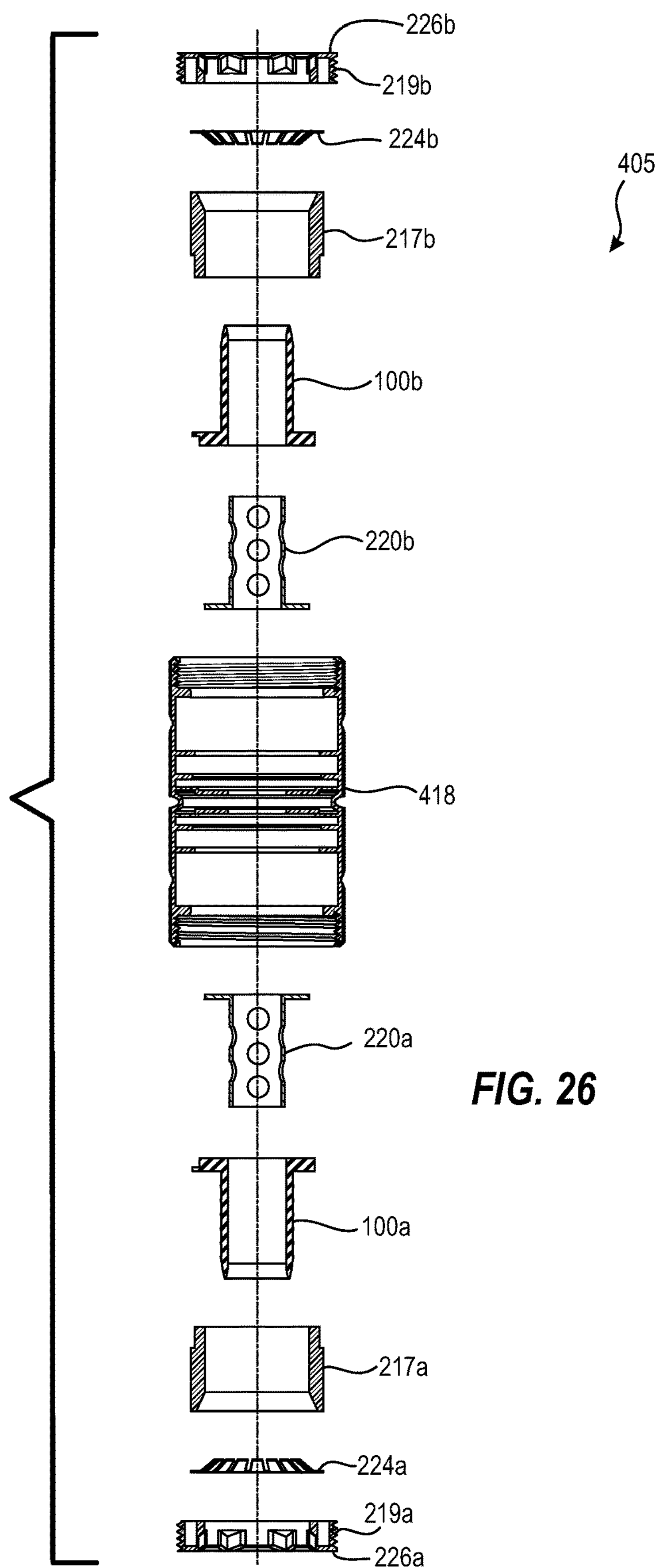
FIG. 26 is an exploded cross-sectional view of the embodiment of the hose mending device shown in FIG. 24.

As a result, as illustrated in FIGS. 25 and 26, the third embodiment of the hose mending device 405 may comprise a first and a second annular lid 226*a-b*, a first and a second ring of gripping teeth 224*a-b*, a first and a second support cylinder 217*a-b*, a first and a second seal member 100*a-b*, a first and a second support cage 220*a-b*, and an outer shell 418. As illustrated, the third embodiment of the hose mending device 405 may comprise an outer shell 418. The outer shell 418 may comprise a first set of threads 219*a* for engaging the first annular lid 226*a* and a second set of threads 219*b* for engaging the second annular lid 226*b*.

Figure 27:
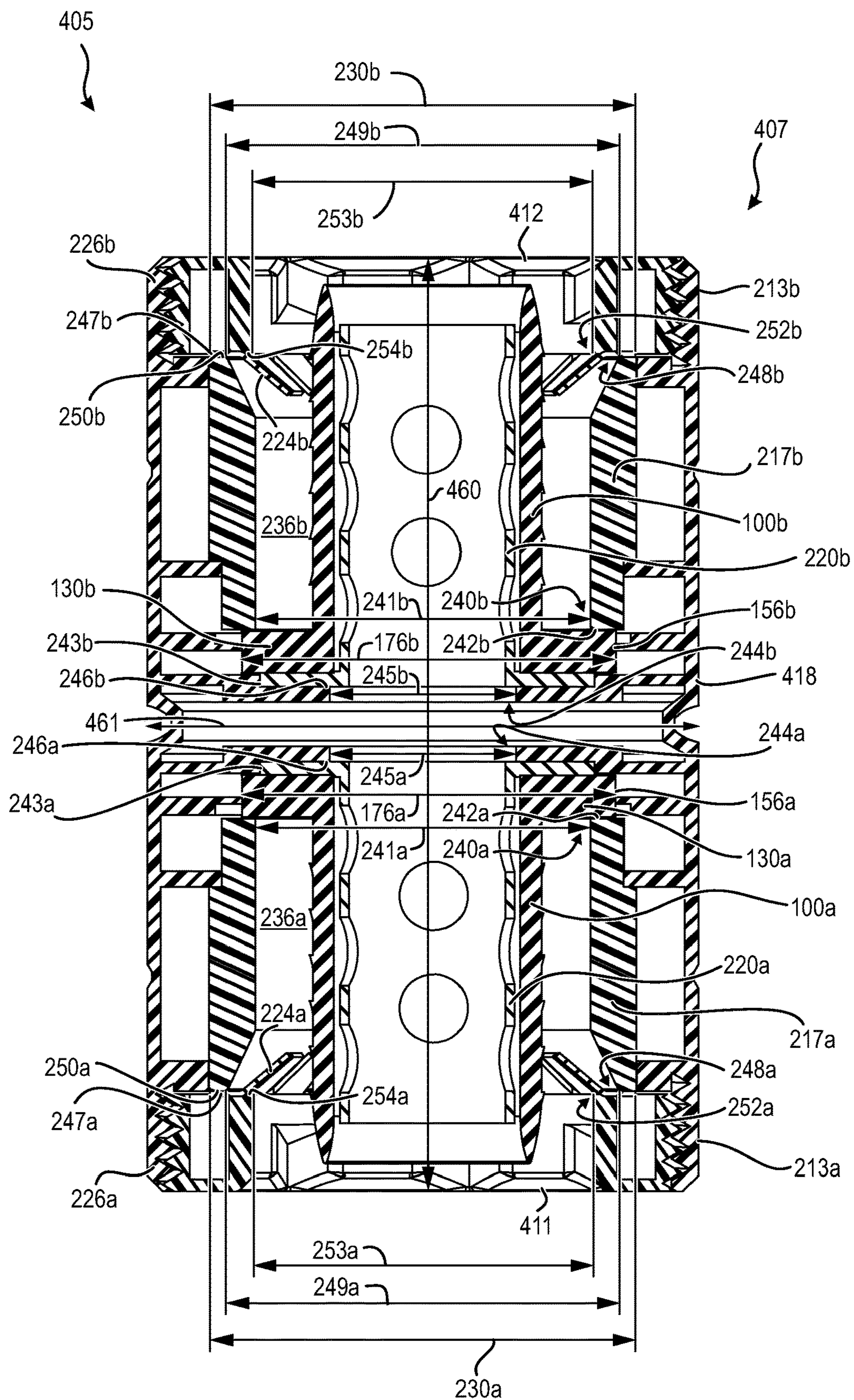
FIG. 27 is a cross-sectional view of the embodiment of the hose mending device shown in FIG. 24.

FIG. 27 provides a cross-sectional view of the third embodiment of the hose mending device 405. As explained above, hose mending device 405 utilizes two of the first couplings 213 utilized in the first and second embodiments of the hose mending device 205, 305

Accordingly, the first coupling 213*a*, shown in FIG. 27, may comprise a first ring of gripping teeth 224*a*; a first seal member 100*a*; a first support cage 220*a*; a first support cylinder 217*a* (which may comprise the first and third radially inward projecting ledges 242*a*, 250*a* and the radially inward disposed surfaces of the first support cylinder 217*a* that circumscribe a portion of the first peripheral recess 236*a*); a second radially inward projecting ledge 246*a* (which may comprise a portion of the outer shell 418) and a first annular lid 226*a* (which may comprise inward disposed surfaces that circumscribe a portion of the first peripheral recess 236*a* and the fourth radially inward projecting ledge 254*a*).

The first radially inward projecting ledge 242*a* circumscribes a first aperture 240*a* having a first aperture dimension 241*a* intermediate opposing sides of the first aperture 240*a*. The second radially inward projecting ledge 246*a* circumscribes a second aperture 244*a* having a second aperture dimension 245*a* intermediate opposing sides of the second aperture 244*a*. The first radially inward projecting ledge 242*a* and the second radially inward projecting ledge

246*a* circumscribe the first circumferential recess 243*a*, in which the first annular portion 130*a* is retained.

The first annular portion 130*a* may comprise a first annular portion outer dimension 176*a* extending between opposing sides of the first annular portion exterior surface 156*a*. The first annular portion outer dimension 176*a* is greater than the first aperture dimension 241*a* and the second aperture dimension 245*a* such that the first annular portion 130*a* may be retained within the first circumferential recess 243*a*.

The third radially inward projecting ledge 250*a* circumscribes a third aperture 248*a* having a third aperture dimension 249*a* intermediate opposing sides of the third aperture 248*a*. The fourth radially inward projecting ledge 254*a* circumscribes a fourth aperture 252*a* having a fourth aperture dimension 253*a* intermediate opposing sides of the fourth aperture 252*a*. The third radially inward projecting ledge 250*a* and the fourth radially inward projecting ledge 254*a* circumscribe the second circumferential recess 247*a*. As the third aperture dimension 249*a* and fourth aperture dimension 253*a* are less than the first peripheral annular member outer dimension 230*a* (i.e., the outer dimension of the first ring of gripping teeth 224*a*). Thus, the first coupling 213*a* shown in FIG. 22 functions in the same way as the first coupling 213 of the hose mending device 205 shown in FIG. 17 and as illustrated in connection with FIGS. 18A-C and includes a first peripheral recess 236*a* for receiving and engaging a conduit 256.

Accordingly, the second coupling 213*b*, shown in FIG. 27, may comprise a second ring of gripping teeth 224*b*; a second seal member 100*b*; a second support cage 220*b*; a second support cylinder 217*b* (which may comprise the fifth and seventh radially inward projecting ledges 242*b*, 250*b* and the radially inward disposed surfaces of the second support cylinder 217*b* that circumscribe a portion of a second peripheral recess 236*b*); a sixth radially inward projecting ledge 246*b* (which may comprise a portion of the outer shell 418) and a second annular lid 226*b* (which may comprise inward disposed surfaces that circumscribe a portion of the second peripheral recess 236*b* and the eighth radially inward projecting ledge 254*b*).

The fifth radially inward projecting ledge 242*b* circumscribes a fifth aperture 240*b* having a fifth aperture dimension 241*b* intermediate opposing sides of the fifth aperture 240*b*. The sixth radially inward projecting ledge 246*b* circumscribes a sixth aperture 244*b* having a sixth aperture dimension 245*b* intermediate opposing sides of the sixth aperture 244*b*. The fifth radially inward projecting ledge 242*b* and the sixth radially inward projecting ledge 246*b* circumscribe the third circumferential recess 243*b*, in which the second annular portion 130*b* is retained.

The second annular portion 130*b* may comprise a second annular portion outer dimension 176*b* extending between opposing sides of the second annular portion exterior surface 156*b*. The second annular portion outer dimension 176*b* is greater than the fifth aperture dimension 241*b* and the sixth aperture dimension 245*b* such that the second annular portion 130*b* may be retained within the third circumferential recess 243*b*.

The seventh radially inward projecting ledge 250*b* circumscribes a seventh aperture 248*b* having a seventh aperture dimension 249*b* intermediate opposing sides of the seventh aperture 248*b*. The eighth radially inward projecting ledge 254*b* circumscribes an eighth aperture 252*b* having an eighth aperture dimension 253*b* intermediate opposing sides of the eighth aperture 252*b*. The seventh radially inward projecting ledge 250*b* and the eighth radially inward projecting ledge 254*b* circumscribe the third circumferential recess 243*b*. As the seventh aperture dimension 249*b* and eighth aperture dimension 253*b* are less than the second peripheral annular member outer dimension 230*b* (i.e., the outer dimension of the second ring of gripping teeth 224*b*). Thus, the second coupling 213*b* shown in FIG. 22 functions in the same way as the first coupling 213 of the hose mending device 205 shown in FIG. 17 and as illustrated in connection with FIGS. 18A-C and includes a second peripheral recess 236*b* for receiving and engaging a conduit 256.

Thus, the first and second couplings 213*a-b* shown in FIG. 22 function in a manner similar to the first coupling 213 of the hose mending device 205 shown in FIG. 17 and as illustrated in connection with FIGS. 18A-C.

As shown in FIG. 27, the peripheral body 407 circumscribes a chamber 408. The chamber 408 places the first opening 411 in fluid communication with the second opening 412. The chamber 408 is fluid-tight when fluid conveying devices are coupled to the first and second couplings 213*a*, 213*b* in a fluid-tight manner.

The chamber 408 may comprise a chamber dimension 460 extending within the chamber between the first opening 411 and the second opening 412. A radial dimension 461 is disposed at a perpendicular angle with respect to the chamber dimension 460.

Figure 28:
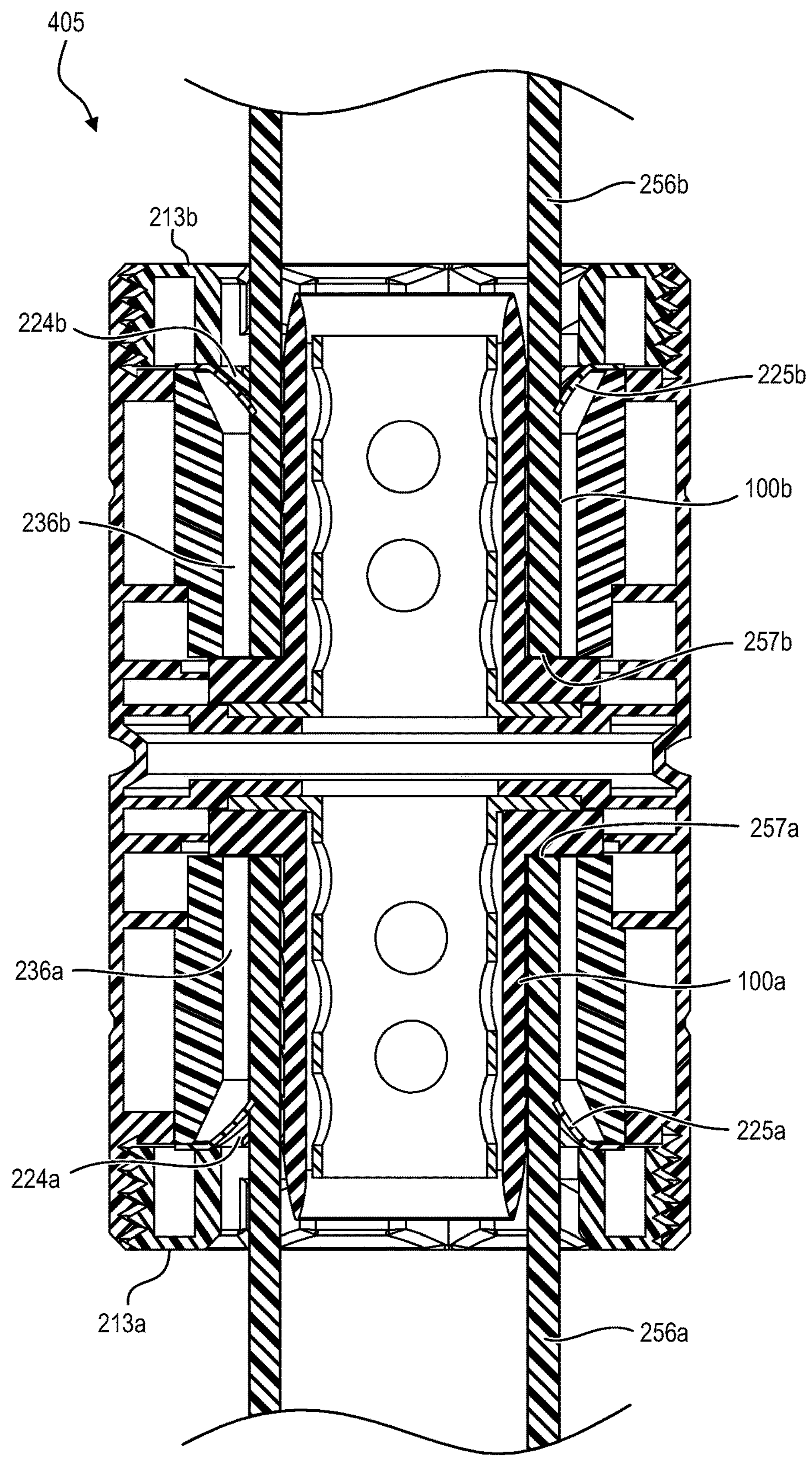
FIG. 28 is a cross-sectional view of the embodiment of the hose mending device shown in FIG. 24 in which two conduits are secured within the first and second couplings of the depicted hose mending device.

FIG. 28 provides a cross-sectional view of the third embodiment of the hose mending device 405. As illustrated in FIG. 28, a first conduit 256*a* may be inserted and secured in a fluid tight engagement within the first peripheral recess 236*a* of the first coupling 213*a*. As illustrated, the teeth 225*a* of the first ring of gripping teeth 224*a* of the first coupling 213*a* have penetrated the outer surface of the first conduit 256*a* and retain the first conduit 256*a* within the first peripheral recess 236*a*. Also, a second conduit 265*b* may be inserted and secured in a fluid tight engagement within the second peripheral recess 236*b* of the second coupling 213*b*. The teeth 225*b* of the second ring of gripping teeth 224*b* of the second coupling 213*b* have penetrated the outer surface of the second conduit 256*b* and retain the second conduit 256*b* within the second peripheral recess 236*b*. Also, the first seal member 100*a* has engaged the first conduit 256*a* in a fluid tight engagement, and the second seal member 100*b* has engaged the second conduit 256*b* in a fluid tight engagement.

Accordingly, the third embodiment of the hose mending device 405 enables repair of damage to the middle of a hose or conduit by removing the damaged portion, thereby creating a first conduit 256*a* and a second conduit 256*b*, and then using the hose mending device 405 to secure the first conduit 256*a* and the second conduit 256*b*, as illustrated in FIG. 27. Of course, as explained previously, the first and second embodiments of the hose mending device 205, 305, could be used in connection with either the first conduit 256*a* or the second conduit 256*b*. Further, as indicated above, the first coupling 213 of the first and second embodiments of the hose mending device 205, 305 and the first and second couplings 213*a-b* of the third embodiment of the hose mending device 405 can be used to secure a conduit 256, 256*a*, 256*b* that is smooth around the outer and inner surface proximate the end of a conduit 256, 256*a*, 256*b* to be attached to the couplings 213, 213*a-b*, i.e., the pertinent conduit 256, 256*a*, 256*b* devoid of grooves, flanges, or beads near the conduit proximal end 257, 257*a-b*.

The three embodiments of the hose mending device 205, 305, 405 disclosed herein are merely illustrative of the disclosed subject matter. Various components features of each of these devices 205, 305, 405 may be utilized in connection with the disclosed subject matter. For example, the outer shell 218, 318, 418 and inward projecting ledges 242, 246, 250, 254, 242*a-b*, 246*a-b*, 250*a-b*, 254*a-b* illustrated in these figures may be embodied in a number of different ways beyond those illustrated herein, as will be understood by one of skill in the art in view of the disclosure provided herein.

The previous description of the disclosed aspects is provided to enable any person skilled in the art to make or use the present disclosure. Various modifications to these aspects will be readily apparent to those skilled in the art and the principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A hose mending device for mending a hose, the hose mending device comprising:

a peripheral body circumscribing:

a first opening and a second opening; and a chamber intermediate the first and the second openings that place the first opening in fluid communication with the second opening, a chamber dimension extending from the first opening to the second opening through the chamber, a radial dimension perpendicular to the chamber dimension;

the peripheral body comprising:

a first radially inward projecting ledge circumscribing a first aperture within the chamber, the first aperture having a first aperture dimension intermediate opposing sides of the first aperture;

a second radially inward projecting ledge circumscribing a second aperture within the chamber, the second aperture having a second aperture dimension intermediate opposing sides of the second aperture;

a third radially inward projecting ledge, the third radially inward projecting ledge being disposed intermediate the first radially inward projecting ledge and the first opening along the chamber dimension, the third radially inward projecting ledge circumscribing a third aperture having a third aperture dimension intermediate opposing sides of the third aperture; and a fourth radially inward projecting ledge, the fourth radially inward projecting ledge being positioned intermediate the first opening and the third radially inward projecting ledge along the chamber dimension, the fourth radially inward projecting ledge circumscribing a fourth aperture having a fourth aperture dimension intermediate opposing sides of the fourth aperture;

wherein the first radially inward projecting ledge is offset from the second radially inward projecting ledge along the chamber dimension such that the first radially inward projecting ledge and the second radially inward projecting ledge circumscribe a circumferential recess within the chamber, the first radially inward projecting ledge being positioned intermediate the second radially inward projecting ledge and the first opening along the chamber dimension;

a combination of the third radially inward projecting ledge and the fourth radially inward projecting ledge circumscribing a second circumferential recess intermediate the third radially inward projecting ledge and the fourth radially inward projecting ledge;

a seal member having a Shore A durometer greater than or equal to 70 and less than or equal to 85, the seal member comprising:

an annular portion having an annular portion peripheral wall, the annular portion peripheral wall comprising an annular portion proximal end, an annular portion distal end, an annular portion exterior surface and an annular portion interior surface, the annular portion interior surface circumscribing an annular portion central passageway from the annular portion distal end to the annular portion proximal end, an annular portion outer dimension extending between opposing sides of the annular portion exterior surface, the annular portion being positioned within the circumferential recess, wherein the annular portion outer dimension is greater than the first aperture dimension and the second aperture dimension;

a cylindrical portion having a cylindrical portion peripheral wall, the cylindrical portion peripheral wall having a cylindrical portion exterior surface and a cylindrical portion interior surface, the cylindrical portion interior surface circumscribing a cylindrical portion central passageway, a cylindrical portion outer dimension extending between opposing sides of the cylindrical portion exterior surface, the cylindrical portion extending from the annular portion proximal end; and a support cage comprising a disk with a disk opening and a cylinder extending from one side of the disk, wherein the disk is positioned adjacent to the annular portion distal end and the cylinder is positioned within the cylindrical portion central passageway to provide support to the cylindrical portion, wherein the cylindrical portion outer dimension is less than the first aperture dimension, the cylindrical portion extending through the first aperture towards the first opening within the chamber such that a combination of the cylindrical portion, the annular portion, the peripheral body and the first opening circumscribe a peripheral recess within the chamber, the peripheral recess being radially intermediate the peripheral body and the cylindrical portion and being shaped and sized to receive an end of a conduit of a particular size.

2. The hose mending device of claim 1, further comprising a ring of gripping teeth, the ring of gripping teeth comprising a peripheral annular member and a plurality of inward projecting gripping teeth, the ring of gripping teeth being positioned within the second circumferential recess, the peripheral annular member having a peripheral annular member outer dimension between opposing sides of the peripheral annular member, the peripheral annular member outer dimension being greater than either the third aperture dimension or the fourth aperture dimension such that the ring of gripping teeth cannot pass through either the third aperture or the fourth aperture such that the ring of gripping teeth is retained within the second circumferential recess.

3. The hose mending device of claim 1, wherein the Shore A durometer of the seal member is greater than or equal to 75 and less than 85.

4. The hose mending device of claim 1, further comprising a coupling for placing the second opening in fluid communication with a fluid conveying device.

5. The hose mending device of claim 4, wherein the coupling is selected from a group consisting of a female coupling and a male coupling.

6. The hose mending device of claim 4, wherein the coupling comprises a second seal member having a Shore A durometer greater than or equal to 70 and less than or equal to 85, the second seal member comprising an annular portion and a cylindrical portion.

7. The hose mending device of claim 6, wherein the coupling comprises a second ring of gripping teeth.

8. The hose mending device of claim 7, wherein the peripheral body circumscribes a third circumferential recess for retaining the second seal member and a fourth circumferential recess for retaining the second ring of gripping teeth.

9. A method of using the hose mending device of claim 2, comprising:

positioning the end of the conduit within the peripheral recess such that the cylindrical portion exterior surface is disposed adjacent to an interior surface of the conduit to form a fluid tight seal intermediate the cylindrical portion and the conduit.

10. The method of claim 9, further comprising positioning the end of the conduit within the peripheral recess such that the teeth of the gripping ring penetrate an outer surface of the conduit to retain the conduit within the peripheral recess.

11. A hose mending device for mending a hose, the hose mending device comprising:

a peripheral body circumscribing:

a first opening and a second opening; and a chamber intermediate the first and the second openings that place the first opening in fluid communication with the second opening, a chamber dimension extending from the first opening to the second opening through the chamber, a radial dimension perpendicular to the chamber dimension;

the peripheral body comprising:

a first radially inward projecting ledge circumscribing a first aperture within the chamber, the first aperture having a first aperture dimension intermediate opposing sides of the first aperture;

a second radially inward projecting ledge circumscribing a second aperture within the chamber, the second aperture having a second aperture dimension intermediate opposing sides of the second aperture;

a third radially inward projecting ledge, the third radially inward projecting ledge being disposed intermediate the first radially inward projecting ledge and the first opening along the chamber dimension, the third radially inward projecting ledge circumscribing a third aperture having a third aperture dimension intermediate opposing sides of the third aperture; and a fourth radially inward projecting ledge, the fourth radially inward projecting ledge being positioned intermediate the first opening and the third radially inward projecting ledge along the chamber dimension, the fourth radially inward projecting ledge circumscribing a fourth aperture having a fourth aperture dimension intermediate opposing sides of the fourth aperture;

wherein the first radially inward projecting ledge is offset from the second radially inward projecting ledge along the chamber dimension such that the first radially inward projecting ledge and the second radially inward projecting ledge circumscribe a circumferential recess within the chamber;

the combination of the third radially inward projecting ledge and the fourth radially inward projecting ledge circumscribing a second circumferential recess intermediate the third radially inward projecting ledge and the fourth radially inward projecting ledge;

a seal member having a Shore A durometer greater than or equal to 70 and less than or equal to 85, the seal member comprising:

an annular portion having an annular portion peripheral wall, the annular portion peripheral wall having an annular portion exterior surface and an annular portion interior surface, the annular portion interior surface circumscribing an annular portion central passageway, an annular portion outer dimension extending between opposing sides of the annular portion exterior surface, the annular portion being positioned within the circumferential recess, wherein the annular portion outer dimension is greater than the first aperture dimension and the second aperture dimension; and a cylindrical portion having a cylindrical portion peripheral wall, the cylindrical portion peripheral wall having a cylindrical portion exterior surface and a cylindrical portion interior surface, the cylindrical portion interior surface circumscribing a cylindrical portion central passageway, a cylindrical portion outer dimension extending between opposing sides of the cylindrical portion exterior surface, wherein the cylindrical portion outer dimension is less than the first aperture dimension, the cylindrical portion extending through the first aperture towards the first opening within the chamber such that a combination of the cylindrical portion, the annular portion, the peripheral body and the first opening circumscribe a peripheral recess within the chamber, the peripheral recess being radially intermediate the peripheral body and the cylindrical portion and being sized and shaped to receive an open end of a conduit of a particular size.

12. The hose mending device of claim 11, further comprising a ring of gripping teeth, the ring of gripping teeth comprising a peripheral annular member and a plurality of inward projecting gripping teeth, the ring of gripping teeth being positioned within the second circumferential recess, the peripheral annular member having a peripheral outer dimension greater than either the third aperture dimension or the fourth aperture dimension such that the ring of gripping teeth cannot pass through either the third aperture or the fourth aperture such that the ring of gripping teeth is retained within the second circumferential recess.

13. The hose mending device of claim 11, wherein the Shore A durometer of the seal member is greater than or equal to 75 and less than 85.

14. The hose mending device of claim 11, further comprising a coupling for placing the second opening in fluid communication with a fluid conveying device.

15. The hose mending device of claim 14, wherein the coupling is selected from a group consisting of a female coupling and a male coupling.

16. The hose mending device of claim 14, wherein the coupling comprises a second seal member having a Shore A durometer greater than or equal to 70 and less than or equal to 85, the second seal member comprising an annular portion and a cylindrical portion.

17. The hose mending device of claim 16, wherein the coupling comprises a second ring of gripping teeth.

18. The hose mending device of claim 17, wherein the peripheral body circumscribes a third circumferential recess for retaining the second seal member and a fourth circumferential recess for retaining the second ring of gripping teeth.

* * * * *